United States Patent
Li

(10) Patent No.: US 10,230,511 B2
(45) Date of Patent: Mar. 12, 2019

(54) PILOT SIGNAL TRANSMISSION METHOD AND APPARATUS

(71) Applicant: HUAWEI TECHNOLOGIES CO., LTD., Shenzhen (CN)

(72) Inventor: Yuanjie Li, Shanghai (CN)

(73) Assignee: HUAWEI TECHNOLOGY CO., LTD., Shenzhen (CN)

( * ) Notice: Subject to any disclaimer, the term of this patent is extended or adjusted under 35 U.S.C. 154(b) by 71 days.

(21) Appl. No.: 15/217,441

(22) Filed: Jul. 22, 2016

(65) Prior Publication Data

US 2016/0329998 A1 Nov. 10, 2016

Related U.S. Application Data

(63) Continuation of application No. PCT/CN2014/071370, filed on Jan. 24, 2014.

(51) Int. Cl.
*H04L 5/00* (2006.01)
*H04L 27/26* (2006.01)
*H04W 72/04* (2009.01)

(52) U.S. Cl.
CPC ............ *H04L 5/005* (2013.01); *H04L 5/0048* (2013.01); *H04L 27/2636* (2013.01); *H04W 72/0413* (2013.01); *H04L 5/0007* (2013.01)

(58) Field of Classification Search
CPC .......... H04J 13/00; H04L 5/00; H04L 5/0053; H04L 5/006; H04L 5/14; H04L 27/26; H04W 72/04
See application file for complete search history.

(56) References Cited

U.S. PATENT DOCUMENTS

| 2009/0052357 A1* | 2/2009 | Suo ............... H04L 5/006 370/280 |
| 2009/0122901 A1 | 5/2009 | Choi et al. |
| 2009/0323838 A1 | 12/2009 | Ho et al. |

(Continued)

FOREIGN PATENT DOCUMENTS

| CN | 101605117 A | 12/2009 |
| CN | 101836412 A | 9/2010 |

(Continued)

OTHER PUBLICATIONS

Extended European Search Report dated Dec. 23, 2016 in corresponding European Patent Application No. 14880099.8.

(Continued)

*Primary Examiner* — Andrew Lai
*Assistant Examiner* — Leon T Andrews
(74) *Attorney, Agent, or Firm* — Staas & Halsey LLP

(57) ABSTRACT

A method and apparatus relate to the communications system field, and can enlarge an uplink coverage range. The method includes: first, determining a PRB pair of which a quantity of subcarriers is less than 12, then, adding pilot signals to the PRB pair, and finally, sending the pilot signals carried in the PRB pair; or first, determining, from an uplink subframe and a special subframe that are of a TDD radio frame, a subframe for carrying a pilot signal, then, adding a pilot signal to the subframe for carrying a pilot signal, and adding a PUSCH to a special subframe of the TDD radio frame. The embodiments of the present invention are applicable to pilot signal transmission in a narrowband system.

16 Claims, 14 Drawing Sheets

(56) References Cited

U.S. PATENT DOCUMENTS

2012/0307760 A1* 12/2012 Han ................. H04L 5/001
                                                  370/329
2012/0327801 A1  12/2012 Seo et al.
2015/0049685 A1*  2/2015 Chen ................ H04L 5/0053
                                                  370/329

FOREIGN PATENT DOCUMENTS

CN      102143586 A     8/2011
CN      103312434 A     9/2013

OTHER PUBLICATIONS

International Search Report and Written Opinion dated Nov. 4, 2014 in corresponding International Patent Application No. PCT/CN2014/071370.
"PDSCH/PUSCH coverage improvements for low-cost MTC", 3GPP TSG RAN WG1 Meeting #72bis, R1-131370, Apr. 15-19, 2013, Chicago, IL, USA, pp. 1-5.
Erik Dahlman et al., "Downlink Physical-Layer Processing", 4G: LTE/LTE-Advanced for Mobile Broadband, Chapter 10, Elsevier Ltd., 2014, pp. 161-240.
International Search Report dated Nov. 4, 2014 in corresponding International Application No. PCT/CN2014/071370.
Office Action, dated Nov. 12, 2018, in Chinese Application No. 201480038220.1 (7 pp.).

\* cited by examiner

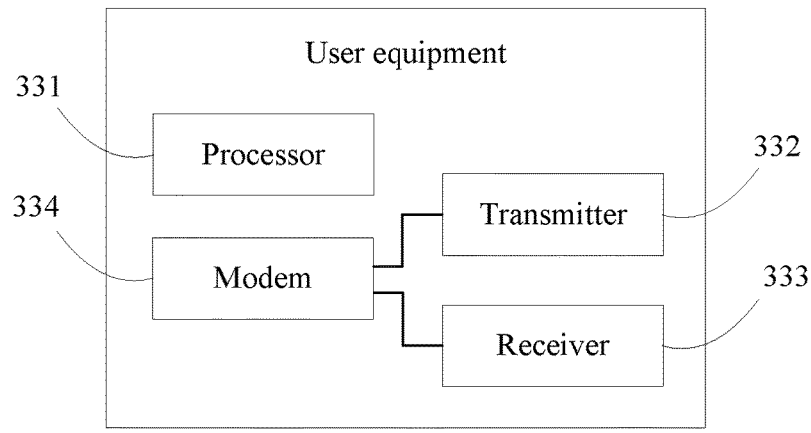
FIG. 33
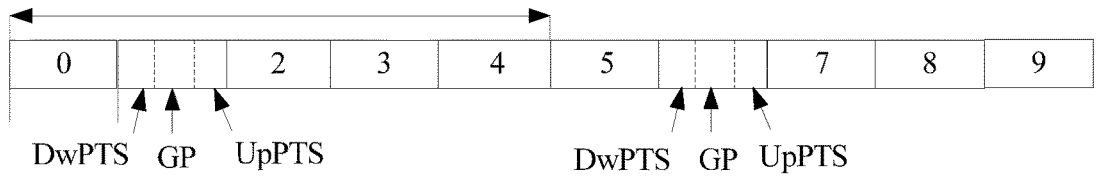
FIG. 34
UE determines, from an uplink subframe and a special subframe that are of a time division duplex TDD radio frame, a subframe for carrying a pilot signal — 3501
The UE adds a pilot signal to the subframe for carrying a pilot signal, and adds a physical uplink shared channel PUSCH to a special subframe of the TDD radio frame — 3502
FIG. 35

PILOT SIGNAL TRANSMISSION METHOD AND APPARATUS

CROSS-REFERENCE TO RELATED APPLICATIONS

This application is a continuation of International Application No. PCT/CN2014/071370, filed on Jan. 24, 2014, which is hereby incorporated by reference in its entirety.

TECHNICAL FIELD

The present invention relates to the communications system field, and in particular, to a pilot signal transmission method and apparatus.

BACKGROUND

In a mobile communications system, a receive end generally needs to perform channel estimation on a current transport channel after receiving data, so as to perform balance processing on the received data, and further eliminate impact of the transport channel on a signal. Specifically, a transmit end transmits, on some REs (resource element) of each PRB (physical resource block) pair, pilot signals known by the transmit end and the receive end, so as to implement that the receive end performs channel estimation by using the pilot signals.

Currently, pilot signals are transmitted in a PRB pair that occupies 12 subcarriers in a frequency domain, so as to perform channel estimation by using the pilot signals. Specifically, a pilot signal is transmitted on an intermediate SC-FDMA (single carrier frequency division multiple access) symbol in each slot of the PRB pair. The PRB pair is an uplink subframe of an FDD (Frequency Division Duplexing) radio frame or an uplink subframe of a TDD (Time Division Duplexing) radio frame. Each PRB pair includes two slots. Each PRB pair occupies 12 subcarriers in the frequency domain. In a common CP structure, each PRB pair occupies 14 SC-FDMA symbols in a time domain, and in an extended CP structure, each PRB pair occupies 12 SC-FDMA symbols in the time domain.

However, when a pilot signal is transmitted in a common subframe that occupies 12 subcarriers in the frequency domain, a transmission distance of a PRB pair cannot be increased for a system with a limited power, which causes a relatively small uplink coverage range.

SUMMARY

Embodiments of the present invention provide a pilot signal transmission method and apparatus, which can enlarge an uplink coverage range.

Technical solutions adopted in the embodiments of the present invention are as follows:

According to a first aspect, an embodiment of the present invention provides a pilot signal transmission method, including:

determining a physical resource block PRB pair, where a quantity of subcarriers of the PRB pair is less than 12;
adding pilot signals to the PRB pair; and
sending the pilot signals carried in the PRB pair.

With reference to the first aspect, in a first possible implementation manner of the first aspect, a quantity of pilot single carrier frequency division multiple access SC-FDMA symbols of the PRB pair is greater than 2, and the pilot SC-FDMA symbols are used to carry pilot signals.

With reference to the first aspect or the first possible implementation manner of the first aspect, in a second possible implementation manner of the first aspect, the step of adding pilot signals to the PRB pair includes:

adding the pilot signals to the PRB pair according to a first pilot structure, where pilot SC-FDMA symbols corresponding to the first pilot structure are not adjacent to each other.

With reference to the first aspect or the first possible implementation manner of the first aspect, in a third possible implementation manner of the first aspect, the step of adding pilot signals to the PRB pair includes:

adding the pilot signals to the PRB pair according to a second pilot structure, where the second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

With reference to the first aspect, the first possible implementation manner of the first aspect, the second possible implementation manner of the first aspect, or the third possible implementation manner of the first aspect, in a fourth possible implementation manner of the first aspect, the pilot signals include a non-zero power pilot signal and a zero power pilot signal.

With reference to the fourth possible implementation manner of the first aspect, in a fifth possible implementation manner of the first aspect, before the step of sending the pilot signals carried in the PRB pair, the method further includes:

acquiring configuration information of the non-zero power pilot signal by using higher layer signaling, physical layer signaling, or a cell identity ID; or acquiring configuration information of the zero power pilot signal by using higher layer signaling, physical layer signaling, or a cell ID.

With reference to the fifth possible implementation manner of the first aspect, in a sixth possible implementation manner of the first aspect, the step of acquiring configuration information of the non-zero power pilot signal by using higher layer signaling, physical layer signaling, or a cell identity ID includes:

acquiring the configuration information of the non-zero power pilot signal by using a formula n=(n_cellID)mod m, where n is a configuration index for sending the non-zero power pilot signal, n_cellID is the cell ID, and m is a total quantity of configurations for sending the non-zero power pilot signal; and the step of acquiring configuration information of the zero power pilot signal by using higher layer signaling, physical layer signaling, or a cell ID includes:

acquiring the configuration information of the zero power pilot signal by using a formula n=(n_cellID)mod m, where n is a configuration index for sending the zero power pilot signal, n_cellID is the cell ID, and m is a total quantity of configurations for sending the zero power pilot signal.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, the step of adding pilot signals to the PRB pair includes:

adding the pilot signals to the PRB pair according to a pilot sequence of the PRB pair, where the pilot sequence of the PRB pair is a truncated ZC sequence, an orthogonal sequence, or a two-dimensional time-frequency orthogonal sequence.

According to a second aspect, an embodiment of the present invention provides a pilot signal transmission apparatus, including:

a determining unit, configured to determine a physical resource block PRB pair, where a quantity of subcarriers of the PRB pair is less than 12;

a carrying unit, configured to add pilot signals to the PRB pair determined by the determining unit; and a sending unit, configured to send the pilot signals that are carried in the PRB pair by using the carrying unit.

With reference to the second aspect, in a first possible implementation manner of the second aspect, a quantity of pilot single carrier frequency division multiple access SC-FDMA symbols of the PRB pair determined by the determining unit is greater than 2, and the pilot SC-FDMA symbols are used to carry pilot signals.

With reference to the second aspect or the first possible implementation manner of the second aspect, in a second possible implementation manner of the second aspect, the carrying unit is specifically configured to add, according to a first pilot structure, the pilot signals to the PRB pair determined by the determining unit, where pilot SC-FDMA symbols corresponding to the first pilot structure are not adjacent to each other.

With reference to the second aspect or the first possible implementation manner of the second aspect, in a third possible implementation manner of the second aspect, the carrying unit is further specifically configured to add, according to a second pilot structure, the pilot signals to the PRB pair determined by the determining unit, where the second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

With reference to the second aspect, the first possible implementation manner of the second aspect, the second possible implementation manner of the second aspect, or the third possible implementation manner of the second aspect, in a fourth possible implementation manner of the second aspect, the pilot signals added by the carrying unit include a non-zero power pilot signal and a zero power pilot signal.

With reference to the fourth possible implementation manner of the second aspect, in a fifth possible implementation manner of the second aspect, the apparatus further includes an acquiring unit, where:

the acquiring unit is configured to acquire configuration information of the non-zero power pilot signal by using higher layer signaling, physical layer signaling, or a cell identity ID; or the acquiring unit is further configured to acquire configuration information of the zero power pilot signal by using higher layer signaling, physical layer signaling, or a cell ID.

With reference to the fifth possible implementation manner of the second aspect, in a sixth possible implementation manner of the second aspect, the acquiring unit is specifically configured to acquire the configuration information of the non-zero power pilot signal by using a formula n=(n_cellID) mod m, where n is a configuration index for sending the non-zero power pilot signal, n_cellID is the cell ID, and m is a total quantity of configurations for sending the non-zero power pilot signal; or the acquiring unit is further specifically configured to acquire the configuration information of the zero power pilot signal by using a formula n=(n_cellID)mod m where n is a configuration index for sending the zero power pilot signal, n_cellID is the cell ID, and m is a total quantity of configurations for sending the zero power pilot signal.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner of the second aspect, the carrying unit is specifically configured to add, according to a pilot sequence of the PRB pair, the pilot signals to the PRB pair determined by the determining unit, where the pilot sequence of the PRB pair is a truncated ZC sequence, an orthogonal sequence, or a two-dimensional time-frequency orthogonal sequence.

According to a third aspect, an embodiment of the present invention provides user equipment, including:

a processor, configured to: determine a physical resource block PRB pair, and add pilot signals to the PRB pair, where a quantity of subcarriers of the PRB pair is less than 12;

a transmitter, configured to send the pilot signals carried in the PRB pair;

a receiver, configured to receive a control signal or a data signal; and a modem, configured to convert a control signal or a data signal that needs to be received by the receiver into a digital modulated signal that is applicable to channel transmission.

With reference to the third aspect, in a first possible implementation manner of the third aspect, a quantity of pilot single carrier frequency division multiple access SC-FDMA symbols of the PRB pair determined by the processor is greater than 2, and the pilot SC-FDMA symbols are used to carry pilot signals.

With reference to the third aspect or the first possible implementation manner of the third aspect, in a second possible implementation manner of the third aspect, the processor is further configured to add the pilot signals to the PRB pair according to a first pilot structure, where pilot SC-FDMA symbols corresponding to the first pilot structure are not adjacent to each other.

With reference to the third aspect or the first possible implementation manner of the third aspect, in a third possible implementation manner of the third aspect, the processor is further configured to add the pilot signals to the PRB pair according to a second pilot structure, where the second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

With reference to the third aspect, the first possible implementation manner of the third aspect, the second possible implementation manner of the third aspect, or the third possible implementation manner of the third aspect, in a fourth possible implementation manner of the third aspect, the pilot signals added by the processor include a non-zero power pilot signal and a zero power pilot signal.

With reference to the fourth possible implementation manner of the third aspect, in a fifth possible implementation manner of the third aspect, the processor is further configured to acquire configuration information of the non-zero power pilot signal by using higher layer signaling, physical layer signaling, or a cell identity ID; or the processor is further configured to acquire configuration information of the zero power pilot signal by using higher layer signaling, physical layer signaling, or a cell ID.

With reference to the fifth possible implementation manner of the third aspect, in a sixth possible implementation manner of the third aspect, the processor is further configured to acquire the configuration information of the non-zero power pilot signal by using a formula n=(n_cellID)mod m where n is a configuration index for sending the non-zero power pilot signal, n_cellID is the cell ID, and m is a total quantity of configurations for sending the non-zero power pilot signal; or the processor is further configured to acquire the configuration information of the zero power pilot signal by using a formula n=(n_cellID)mod m where n is a configuration index for sending the zero power pilot signal, n_cellID is the cell ID, and m is a total quantity of configurations for sending the zero power pilot signal.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a seventh possible implementation manner of the third aspect, the processor is further configured to add the pilot signals to the PRB pair according to a pilot sequence of the PRB pair, where the pilot sequence of the PRB pair is a truncated ZC sequence, an orthogonal sequence, or a two-dimensional time-frequency orthogonal sequence.

According to a fourth aspect, an embodiment of the present invention provides a pilot signal transmission method, including:

receiving, by a base station, a physical resource block PRB pair sent by user equipment UE, where a quantity of subcarriers of the PRB pair is less than 12; and acquiring, by the base station, pilot signals carried in the PRB pair.

With reference to the fourth aspect, in a first possible implementation manner of the fourth aspect, a quantity of pilot single carrier frequency division multiple access SC-FDMA symbols of the PRB pair is greater than 2, and the pilot SC-FDMA symbols are used to carry pilot signals.

With reference to the fourth aspect or the first possible implementation manner of the fourth aspect, in a second possible implementation manner of the fourth aspect, the step of acquiring, by the base station, pilot signals carried in the PRB pair includes:

acquiring, by the base station according to a first pilot structure, the pilot signals carried in the PRB pair, where pilot SC-FDMA symbols corresponding to the first pilot structure are not adjacent to each other.

With reference to the fourth aspect or the first possible implementation manner of the fourth aspect, in a third possible implementation manner of the fourth aspect, the step of acquiring, by the base station, pilot signals carried in the PRB pair includes:

acquiring, by the base station according to a second pilot structure, the pilot signals carried in the PRB pair, where the second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, the pilot signals include a non-zero power pilot signal and a zero power pilot signal.

With reference to the fourth possible implementation manner of the fourth aspect, in a fifth possible implementation manner of the fourth aspect, before the step of receiving, by a base station, a physical resource block PRB pair sent by user equipment UE, the method further includes:

sending, by the base station to the UE, higher layer signaling that carries configuration information of the non-zero power pilot signal or physical layer signaling that carries configuration information of the non-zero power pilot signal; or sending, by the base station to the UE, higher layer signaling that carries configuration information of the zero power pilot signal or physical layer signaling that carries configuration information of the zero power pilot signal.

With reference to the fourth possible implementation manner of the fourth aspect, in a sixth possible implementation manner of the fourth aspect, before the step of receiving, by a base station, a physical resource block PRB pair sent by user equipment UE, the method further includes:

acquiring, by the base station, configuration information of the non-zero power pilot signal by using a cell identity ID; or acquiring, by the base station, configuration information of the zero power pilot signal by using a cell ID.

With reference to the sixth possible implementation manner of the fourth aspect, in a seventh possible implementation manner of the fourth aspect, the step of acquiring, by the base station, configuration information of the non-zero power pilot signal by using a cell identity ID includes:

acquiring, by the base station, the configuration information of the non-zero power pilot signal by using a formula n=(n_cellID)mod m where n is a configuration index for sending the non-zero power pilot signal, n_cellID is the cell ID, and m is a total quantity of configurations for sending the non-zero power pilot signal; and the step of acquiring, by the base station, configuration information of the zero power pilot signal by using a cell ID includes:

acquiring, by the base station, the configuration information of the zero power pilot signal by using a formula n=(n_cellID)mod m where n is a configuration index for sending the zero power pilot signal, n_cellID is the cell ID, and m is a total quantity of configurations for sending the zero power pilot signal.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, or the seventh possible implementation manner of the fourth aspect, in an eighth possible implementation manner of the fourth aspect, the step of acquiring, by the base station, pilot signals carried in the PRB pair includes:

acquiring, by the base station according to a pilot sequence of the PRB pair, the pilot signals carried in the PRB pair, where the pilot sequence of the PRB pair is a truncated ZC sequence, an orthogonal sequence, or a two-dimensional time-frequency orthogonal sequence.

According to a fifth aspect, an embodiment of the present invention provides a pilot signal transmission apparatus, including:

a receiving unit, configured to receive a physical resource block PRB pair sent by user equipment UE, where a quantity of subcarriers of the PRB pair is less than 12; and an acquiring unit, configured to acquire pilot signals carried in the PRB pair received by the receiving unit.

With reference to the fifth aspect, in a first possible implementation manner of the fifth aspect, a quantity of pilot single carrier frequency division multiple access SC-FDMA symbols of the PRB pair received by the receiving unit is greater than 2, and the pilot SC-FDMA symbols are used to carry pilot signals.

With reference to the fifth aspect or the first possible implementation manner of the fifth aspect, in a second possible implementation manner of the fifth aspect, the acquiring unit is specifically configured to acquire, according to a first pilot structure, the pilot signals carried in the PRB pair received by the receiving unit, where pilot SC-FDMA symbols corresponding to the first pilot structure are not adjacent to each other.

With reference to the fifth aspect or the first possible implementation manner of the fifth aspect, in a third possible implementation manner of the fifth aspect, the acquiring unit is further specifically configured to acquire, according to a second pilot structure, the pilot signals carried in the PRB pair received by the receiving unit, where the second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

With reference to the fifth aspect, the first possible implementation manner of the fifth aspect, the second possible implementation manner of the fifth aspect, or the third possible implementation manner of the fifth aspect, in a fourth possible implementation manner of the fifth aspect, the pilot signals acquired by the acquiring unit include a non-zero power pilot signal and a zero power pilot signal.

With reference to the fourth possible implementation manner of the fifth aspect, in a fifth possible implementation manner of the fifth aspect, the sending unit is configured to send, to the UE, higher layer signaling that carries configuration information of the non-zero power pilot signal or physical layer signaling that carries configuration information of the non-zero power pilot signal; or the sending unit is further configured to send, to the UE, higher layer signaling that carries configuration information of the zero power pilot signal or physical layer signaling that carries configuration information of the zero power pilot signal.

With reference to the fourth possible implementation manner of the fifth aspect, in a sixth possible implementation manner of the fifth aspect, the acquiring unit is further configured to acquire configuration information of the non-zero power pilot signal by using a cell identity ID; or the acquiring unit is further configured to acquire configuration information of the zero power pilot signal by using a cell ID.

With reference to the sixth possible implementation manner of the fifth aspect, in a seventh possible implementation manner of the fifth aspect, the acquiring unit is specifically configured to acquire the configuration information of the non-zero power pilot signal by using a formula n=(n_cellID) mod m where n is a configuration index for sending the non-zero power pilot signal, n_cellID is the cell ID, and m is a total quantity of configurations for sending the non-zero power pilot signal; or the acquiring unit is further specifically configured to acquire the configuration information of the zero power pilot signal by using a formula n=(n_cellID) mod m where n is a configuration index for sending the zero power pilot signal, n_cellID is the cell ID, and m is a total quantity of configurations for sending the zero power pilot signal.

With reference to the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, or the seventh possible implementation manner of the fifth aspect, in an eighth possible implementation manner of the fifth aspect, the acquiring unit is specifically configured to acquire, according to a pilot sequence of the PRB pair, the pilot signals carried in the PRB pair received by the receiving unit, where the pilot sequence of the PRB pair is a truncated ZC sequence, an orthogonal sequence, or a two-dimensional time-frequency orthogonal sequence.

According to a sixth aspect, an embodiment of the present invention provides a pilot signal transmission apparatus, including:

a receiver, configured to receive a physical resource block PRB pair sent by user equipment UE, where a quantity of subcarriers of the PRB pair is less than 12;

a processor, configured to acquire pilot signals carried in the PRB pair received by the receiving unit;

a transmitter, configured to transmit a control signal or a data signal; and a modem, configured to convert a control signal or a data signal that needs to be transmitted by the transmitter into a digital modulated signal that is applicable to channel transmission.

With reference to the sixth aspect, in a first possible implementation manner of the sixth aspect, a quantity of pilot single carrier frequency division multiple access SC-FDMA symbols of the PRB pair received by the receiver is greater than 2, and the pilot SC-FDMA symbols are used to carry pilot signals.

With reference to the sixth aspect or the first possible implementation manner of the sixth aspect, in a second possible implementation manner of the sixth aspect, the processor is further configured to acquire, according to a first pilot structure, the pilot signals carried in the PRB pair received by the receiver, where pilot SC-FDMA symbols corresponding to the first pilot structure are not adjacent to each other.

With reference to the sixth aspect or the first possible implementation manner of the sixth aspect, in a third possible implementation manner of the sixth aspect, the processor is further specifically configured to acquire, according to a second pilot structure, the pilot signals carried in the PRB pair received by the receiver, where the second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

With reference to the sixth aspect, the first possible implementation manner of the sixth aspect, the second possible implementation manner of the sixth aspect, or the third possible implementation manner of the sixth aspect, in a fourth possible implementation manner of the sixth aspect, the pilot signals acquired by the processor include a non-zero power pilot signal and a zero power pilot signal.

With reference to the fourth possible implementation manner of the sixth aspect, in a fifth possible implementation manner of the sixth aspect, the transmitter is further configured to send, to the UE, higher layer signaling that carries configuration information of the non-zero power pilot signal or physical layer signaling that carries configuration information of the non-zero power pilot signal; or the transmitter is further configured to send, to the UE, higher layer signaling that carries configuration information of the zero power pilot signal or physical layer signaling that carries configuration information of the zero power pilot signal.

With reference to the fourth possible implementation manner of the sixth aspect, in a sixth possible implementation manner of the sixth aspect, the processor is further configured to acquire configuration information of the non-zero power pilot signal by using a cell identity ID; or the processor is further configured to acquire configuration information of the zero power pilot signal by using a cell ID.

With reference to the sixth possible implementation manner of the sixth aspect, in a seventh possible implementation manner of the sixth aspect, the processor is further configured to acquire the configuration information of the non-zero power pilot signal by using a formula n=(n_cellID) mod m where n is a configuration index for sending the non-zero power pilot signal, n_cellID is the cell ID, and m is a total quantity of configurations for sending the non-zero power pilot signal; or the processor is further configured to acquire the configuration information of the zero power pilot signal by using a formula n=(n_cellID)mod m, n is a configuration index for sending the zero power pilot signal, n_cellID is the cell ID, and m is a total quantity of configurations for sending the zero power pilot signal.

With reference to the sixth aspect, the first possible implementation manner of the sixth aspect, the second possible implementation manner of the sixth aspect, the third possible implementation manner of the sixth aspect, the fourth possible implementation manner of the sixth aspect, the fifth possible implementation manner of the sixth aspect, the sixth possible implementation manner of the sixth aspect, or the seventh possible implementation manner of the sixth aspect, in an eighth possible implementation manner of the sixth aspect, the processor is further configured to acquire, according to a pilot sequence of the PRB pair, the pilot signals carried in the PRB pair received by the receiver, where the pilot sequence of the PRB pair is a truncated ZC sequence, an orthogonal sequence, or a two-dimensional time-frequency orthogonal sequence.

According to a seventh aspect, an embodiment of the present invention provides a pilot signal transmission method, including:

determining, from an uplink subframe and a special subframe that are of a time division duplex TDD radio frame, a subframe for carrying a pilot signal, where the subframe for carrying a pilot signal is a special subframe of the TDD radio frame or an uplink subframe that is after and adjacent to the special subframe; and adding the pilot signal to the subframe for carrying a pilot signal, and adding a physical uplink shared channel PUSCH to the special subframe of the TDD radio frame.

With reference to the seventh aspect, in a first possible implementation manner of the seventh aspect, the step of determining, from an uplink subframe and a special subframe that are of a time division duplex TDD radio frame, a subframe for carrying a pilot signal includes:

determining the special subframe of the TDD radio frame as the subframe for carrying a pilot signal; and the step of adding the pilot signal to the subframe for carrying a pilot signal, and adding a physical uplink shared channel PUSCH to the special subframe of the TDD radio frame includes:

adding the pilot signal to a preset single carrier frequency division multiple access SC-FDMA symbol of the special subframe, and adding the PUSCH to another SC-FDMA symbol of the special subframe.

With reference to the first possible implementation manner of the seventh aspect, in a second possible implementation manner of the seventh aspect, the preset SC-FDMA symbol of the special subframe is a third SC-FDMA symbol in a second slot of the special subframe.

With reference to the seventh aspect, in a third possible implementation manner of the seventh aspect, the step of determining, from an uplink subframe and a special subframe that are of a time division duplex TDD radio frame, a subframe for carrying a pilot signal includes:

determining the uplink subframe that is after and adjacent to the special subframe as the subframe for carrying a pilot signal; and the step of adding the pilot signal to the subframe for carrying a pilot signal, and adding a physical uplink shared channel PUSCH to the special subframe of the TDD radio frame includes:

adding the pilot signal to the uplink subframe that is after and adjacent to the special subframe, and adding the PUSCH to the special subframe.

According to an eighth aspect, an embodiment of the present invention provides a pilot signal transmission apparatus, including:

a determining unit, configured to determine, from an uplink subframe and a special subframe that are of a time division duplex TDD radio frame, a subframe for carrying a pilot signal, where the subframe for carrying a pilot signal is a special subframe of the TDD radio frame or an uplink subframe that is after and adjacent to the special subframe; and a carrying unit, configured to: add the pilot signal to the subframe that is determined by the determining unit and for carrying a pilot signal, and add a physical uplink shared channel PUSCH to the special subframe of the TDD radio frame.

With reference to the eighth aspect, in a first possible implementation manner of the eighth aspect, the determining unit is specifically configured to determine the special subframe of the TDD radio frame as the subframe for carrying a pilot signal; and the carrying unit is specifically configured to: add the pilot signal to a preset single carrier frequency division multiple access SC-FDMA symbol of the special subframe determined by the determining unit, and add the PUSCH to another SC-FDMA symbol of the special subframe.

With reference to the first possible implementation manner of the eighth aspect, in a second possible implementation manner of the eighth aspect, the preset SC-FDMA symbol of the special subframe determined by the determining unit is a third SC-FDMA symbol in a second slot of the special subframe.

With reference to the eighth aspect, in a third possible implementation manner of the eighth aspect, the determining unit is further specifically configured to determine the uplink subframe that is after and adjacent to the special subframe as the subframe for carrying a pilot signal; and the carrying unit is further specifically configured to: add the pilot signal to the uplink subframe that is determined by the determining unit and is after and adjacent to the special subframe, and add the PUSCH to the special subframe.

According to a ninth aspect, an embodiment of the present invention provides user equipment, including:

a processor, configured to: determine, from an uplink subframe and a special subframe that are of a time division duplex TDD radio frame, a subframe for carrying a pilot signal; add the pilot signal to the subframe for carrying a pilot signal; and add a physical uplink shared channel PUSCH to a special subframe of the TDD radio frame, where the subframe for carrying a pilot signal is the special subframe of the TDD radio frame or an uplink subframe that is after and adjacent to the special subframe;

a transmitter, configured to transmit a control signal or a data signal;

a receiver, configured to receive a control signal or a data signal; and a modem, configured to: convert a control signal or a data signal that needs to be transmitted by the transmitter into a digital modulated signal that is applicable to channel transmission, and convert a control signal or a data signal that needs to be received by the receiver into a digital modulated signal that is applicable to channel transmission.

With reference to the ninth aspect, in a first possible implementation manner of the ninth aspect, the processor is further configured to determine the special subframe of the TDD radio frame as the subframe for carrying a pilot signal; and the processor is further configured to: add the pilot signal to a preset single carrier frequency division multiple access SC-FDMA symbol of the special subframe, and add the PUSCH to another SC-FDMA symbol of the special subframe.

With reference to the first possible implementation manner of the ninth aspect, in a second possible implementation manner of the ninth aspect, the preset SC-FDMA symbol of the special subframe determined by the processor is a third SC-FDMA symbol in a second slot of the special subframe.

With reference to the ninth aspect, in a third possible implementation manner of the ninth aspect, the processor is further configured to determine the uplink subframe that is after and adjacent to the special subframe as the subframe for carrying a pilot signal; and the processor is further configured to: add the pilot signal to the uplink subframe that is after and adjacent to the special subframe, and add the PUSCH to the special subframe.

According to a tenth aspect, an embodiment of the present invention provides a pilot signal transmission method, including:

receiving, by a base station, a time division duplex TDD radio frame sent by user equipment UE; and acquiring, by the base station, a pilot signal and a physical uplink shared channel PUSCH that are carried in the TDD radio frame.

With reference to the tenth aspect, in a first possible implementation manner of the tenth aspect, the step of acquiring, by the base station, a pilot signal and a physical uplink shared channel PUSCH that are carried in the TDD radio frame includes:

acquiring, by the base station, the pilot signal on a preset single carrier frequency division multiple access SC-FDMA symbol of a special subframe of the TDD radio frame, and acquiring the PUSCH on another SC-FDMA symbol of the special subframe of the TDD radio frame.

With reference to the first possible implementation manner of the tenth aspect, in a second possible implementation manner of the tenth aspect, the preset SC-FDMA symbol of the special subframe of the TDD radio frame is a third SC-FDMA symbol in a second slot of the special subframe.

With reference to the tenth aspect, in a third possible implementation manner of the tenth aspect, the step of acquiring, by the base station, a pilot signal and a physical uplink shared channel PUSCH that are carried in the TDD radio frame includes:

acquiring, by the base station, the pilot signal on an uplink subframe that is after and adjacent to a special subframe of the TDD radio frame, and acquiring the PUSCH on the special subframe of the TDD radio frame.

According to an eleventh aspect, an embodiment of the present invention provides a pilot signal transmission apparatus, including:

a receiving unit, configured to receive a time division duplex TDD radio frame sent by user equipment UE; and an acquiring unit, configured to acquire a pilot signal and a physical uplink shared channel PUSCH that are carried in the TDD radio frame received by the receiving unit.

With reference to the eleventh aspect, in a first possible implementation manner of the eleventh aspect, the acquiring unit is specifically configured to: acquire the pilot signal on a preset single carrier frequency division multiple access SC-FDMA symbol of a special subframe of the TDD radio frame received by the receiving unit, and acquire the PUSCH on another SC-FDMA symbol of the special subframe of the TDD radio frame.

With the first possible implementation manner of the eleventh aspect, in a second possible implementation manner of the eleventh aspect, the preset SC-FDMA symbol of the special subframe of the TDD radio frame received by the receiving unit is a third SC-FDMA symbol in a second slot of the special subframe.

With the eleventh aspect, in a third possible implementation manner of the eleventh aspect, the acquiring unit is specifically configured to: acquire the pilot signal on an uplink subframe that is after and adjacent to a special subframe of the TDD radio frame received by the receiving unit, and acquire the PUSCH on the special subframe of the TDD radio frame.

According to a twelfth aspect, an embodiment of the present invention provides a base station, including:

a receiver, configured to receive a time division duplex TDD radio frame sent by user equipment UE;

a processor, configured to acquire a pilot signal and a physical uplink shared channel PUSCH that are carried in the TDD radio frame received by the receiver;

a transmitter, configured to transmit a control signal or a data signal; and a modem, configured to convert a control signal or a data signal that needs to be transmitted by the transmitter into a digital modulated signal that is applicable to channel transmission.

With reference to the twelfth aspect, in a first possible implementation manner of the twelfth aspect, the processor is further configured to: acquire the pilot signal on a preset single carrier frequency division multiple access SC-FDMA symbol of a special subframe of the TDD radio frame received by the receiver, and acquire the PUSCH on another SC-FDMA symbol of the special subframe of the TDD radio frame.

With the first possible implementation manner of the twelfth aspect, in a second possible implementation manner of the twelfth aspect, the preset SC-FDMA symbol of the special subframe of the TDD radio frame received by the receiver is a third SC-FDMA symbol in a second slot of the special subframe.

With reference to the twelfth aspect, in a third possible implementation manner of the twelfth aspect, the processor is further configured to: acquire the pilot signal on an uplink subframe that is after and adjacent to a special subframe of the TDD radio frame received by the receiver, and acquire the PUSCH on the special subframe of the TDD radio frame.

According to the pilot signal transmission method and apparatus provided in the embodiments of the present invention, first, a PRB pair of which a quantity of subcarriers is less than 12 is determined; then, pilot signals are carried in the PRB pair; finally, the pilot signals carried in the PRB pair are sent. Compared with a current technology in which pilot signals are transmitted in a PRB pair that occupies 12 subcarriers in a frequency domain, in the embodiments of the present invention, a quantity of subcarriers of a PRB pair is decreased, and corresponding pilot signals are transmitted in the PRB pair of which the quantity of subcarriers is decreased, which can increase average power spectrum density of the subcarriers. Therefore, a transmission distance of the PRB pair may be increased, and an uplink coverage range may further be enlarged.

According to the pilot signal transmission method and apparatus provided in the embodiments of the present invention, first, in an uplink subframe and a special subframe that are of a TDD radio frame, a special subframe of the TDD radio frame or an uplink subframe that is after and adjacent to the special subframe is determined as a subframe for carrying a pilot signal; then, a pilot signal is carried in the subframe for carrying a pilot signal, and a PUSCH (Physical Uplink Shared Channel, physical uplink shared channel) is carried in the special subframe of the TDD radio frame. Compared with a current technology in which a PUSCH is transmitted in a common subframe in a TDD configuration, in the embodiments of the present invention, a data signal is transmitted in UpPTS of a special subframe in the TDD configuration, which can increase resources for data signal transmission. Therefore, a transmission distance of a data signal may be increased, and an uplink coverage range may further be enlarged.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 33 is a schematic structural diagram of user equipment according to Embodiment 5 of the present invention;

FIG. 34 is a schematic structural diagram of a TDD radio frame according to Embodiment 5 of the present invention;

FIG. 35 is a flowchart of a pilot signal transmission method according to Embodiment 6 of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The technical solutions provided in the embodiments of the present invention may be applied to various wireless communications networks, for example, a Long Term Evolution (LTE) system, a Long Term Evolution Advanced (LTE-A system, and a further evolved network of the Long Term Evolution Advanced system. The terms "network" and "system" may be interchanged.

In the embodiments of the present invention, a base station (BS) may be a device that communicates with user equipment (UE) or another communications site, such as a relay site, and the base station may provide communication coverage of a specific physical area. For example, the base station may be specifically an evolved NodeB (evolutional node B, ENB or eNodeB for short) in LTE or LTE-A, or may be another access device that is in a wireless communications network and provides an access service, which is not limited in the present invention.

In the embodiments of the present invention, the UE may be distributed in an entire wireless network, and each UE may be stationary or in motion. The UE may be referred to as a terminal, a mobile station, a subscriber unit (subscriber unit), a station, or the like. The UE may be specifically a wireless communication device, such as a cellular phone, a personal digital assistant (PDA), a handheld device, or a laptop computer. When the UE is applied to machine to machine (M2M) communication, the UE may be referred to as an M2M terminal, and may be specifically a device that supports M2M communication, such as a smart meter or a smart appliance.

To make the advantages of the technical solutions of the present invention clearer, the following describes the present invention in detail with reference to the accompanying drawings and embodiments.

Embodiment 1

Figure 1:
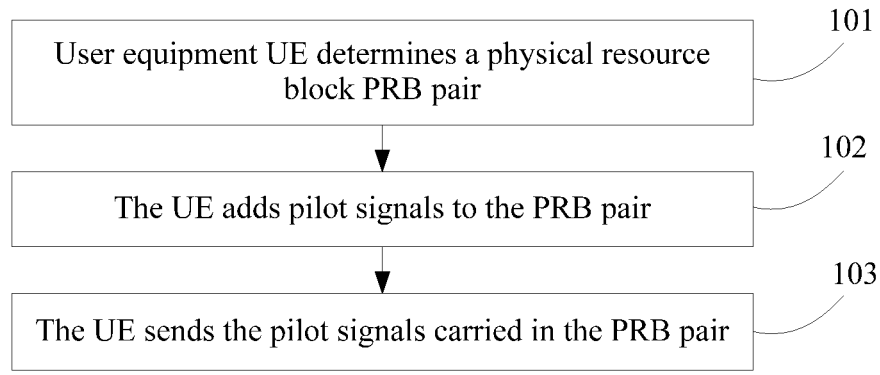
FIG. 1 is a flowchart of a pilot signal transmission method according to Embodiment 1 of the present invention.

This embodiment of the present invention provides a pilot signal transmission method. As shown in FIG. 1, the method includes the following steps:

101. User equipment UE determines a physical resource block PRB pair.

A quantity of subcarriers of the PRB pair is less than 12. In this embodiment of the present invention, the PRB pair may be an uplink subframe in a TDD configuration.

In this embodiment of the present invention, a TDD radio frame supports seven different TDD configurations, which are specifically shown in the following table:

| TDD configuration index | Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 5 ms | D | S | U | U | U | D | D | D | D | D |
| 4 | 5 ms | D | S | U | U | D | D | D | D | D | D |
| 5 | 5 ms | D | S | U | D | D | D | D | D | D | D |
| 6 | 5 ms | D | S | U | U | U | D | S | U | U | D |

For example, when the TDD configuration index is 0, according to the method provided in this embodiment of the present invention, the PRB pair may be the uplink subframe 2, the uplink subframe 3, the uplink subframe 4, the uplink subframe 7, the uplink subframe 8, or the uplink subframe 9; when the TDD configuration index is 3, according to the method provided in this embodiment of the present invention, the PRB pair may be the uplink subframe 2, the uplink subframe 3, or the uplink subframe 4.

In this embodiment of the present invention, a product of the quantity of subcarriers of the PRB pair and a quantity of SC-FDMA symbols of the PRB pair is a preset fixed value. In this embodiment of the present invention, after the quantity of subcarriers of the PRB pair is decreased in a frequency domain, the quantity of SC-FDMA symbols needs to be increased in a time domain accordingly, so as to keep a total quantity of REs in the PRB pair unchanged.

Figure 4:
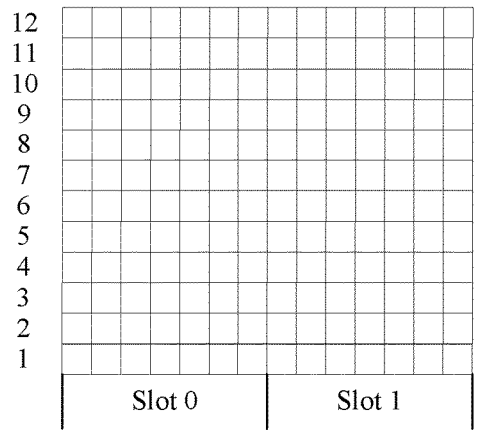
FIG. 4 is a schematic structural diagram of a PRB pair according to Embodiment 1 of the present invention.
Figure 5:
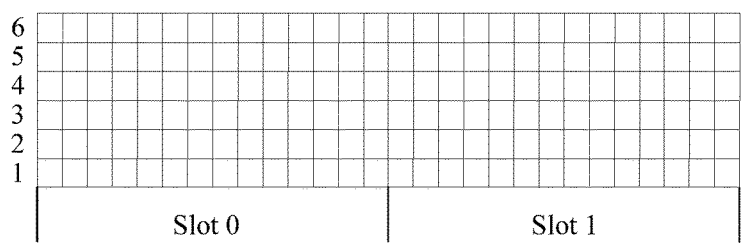
FIG. 5 is a schematic structural diagram of a PRB pair according to Embodiment 1 of the present invention.
Figure 6:
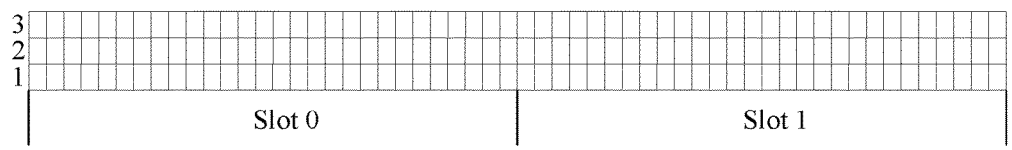
FIG. 6 is a schematic structural diagram of a PRB pair according to Embodiment 1 of the present invention.

Specifically, as shown in FIG. 4, if the quantity of subcarriers of the PRB pair is 12, the quantity of SC-FDMA symbols of the PRB pair is 14, where the PRB pair includes two slots, and each slot is corresponding to seven SC-FDMA symbols. When the quantity of subcarriers of the PRB pair is less than 12, as shown in FIG. 5, if the quantity of subcarriers of the PRB pair is 6, the quantity of SC-FDMA symbols of the PRB pair is 28, where the PRB pair includes two slots, and each slot is corresponding to 14 SC-FDMA symbols; further, as shown in FIG. 6, if the quantity of subcarriers of the PRB pair is 3, the quantity of SC-FDMA symbols of the PRB pair is 56, where the PRB pair includes two slots, and each slot is corresponding to 28 SC-FDMA symbols.

102. The UE adds pilot signals to the PRB pair.

Figure 7:
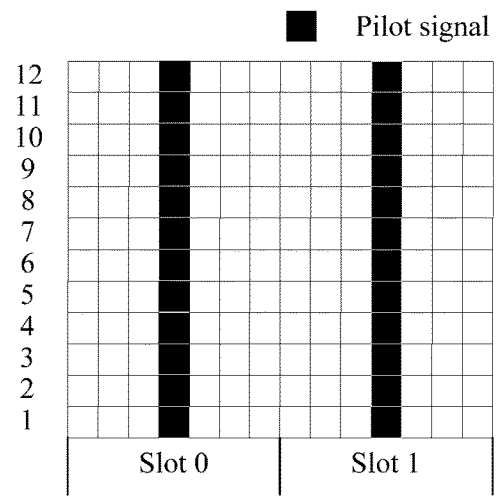
FIG. 7 is a schematic structural diagram of a PRB pair according to Embodiment 1 of the present invention.
Figure 8:
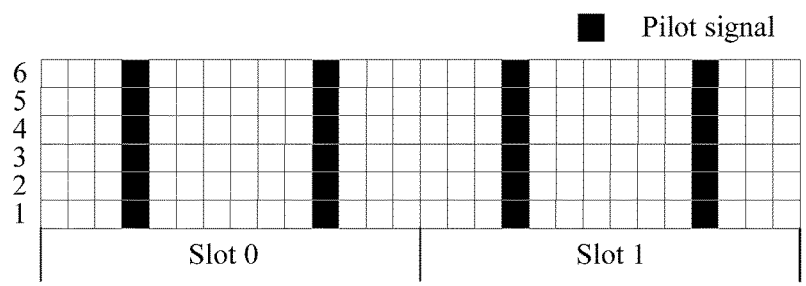
FIG. 8 is a schematic structural diagram of a PRB pair according to Embodiment 1 of the present invention.
Figure 9:
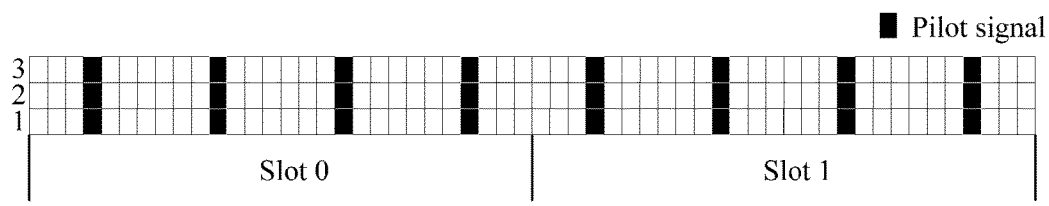
FIG. 9 is a schematic structural diagram of a PRB pair according to Embodiment 1 of the present invention.

In this embodiment of the present invention, when the quantity of subcarriers of the PRB pair is less than 12, a corresponding pilot structure needs to be adjusted accordingly when the UE (User Equipment, user equipment) adds the pilot signals to the PRB pair. Specifically, as shown in FIG. 7, if the quantity of subcarriers of the PRB pair is 12, the UE adds pilot signals to REs that are corresponding to black squares in the figure. When the quantity of subcarriers of the PRB pair is less than 12, as shown in FIG. 8, if the quantity of subcarriers of the PRB pair is 6, the UE adds pilot signals to REs that are corresponding to black squares in the figure; further, as shown in FIG. 9, if the quantity of subcarriers of the PRB pair is 3, the UE adds pilot signals to REs that are corresponding to black squares in the figure.

In this embodiment of the present invention, when the quantity of subcarriers of the PRB pair is less than 12, a corresponding pilot sequence needs to be adjusted accordingly when the UE adds the pilot signals to the PRB pair. Specifically, if the quantity of subcarriers of the PRB pair is 12, a pilot sequence length corresponding to the pilot signals in the PRB pair is 12. When the quantity of subcarriers of the PRB pair is less than 12, if the quantity of subcarriers of the PRB pair is 6, a pilot sequence length corresponding to the pilot signals in the PRB pair is 6; if the quantity of subcarriers of the PRB pair is 3, a pilot sequence length corresponding to the pilot signals in the PRB pair is 3.

103. The UE sends the pilot signals carried in the PRB pair.

In this embodiment of the present invention, a PRB pair that carries pilot signals is sent to a base station, so that the base station can acquire the pilot signals from the received PRB pair, and perform channel estimation according to the pilot signals in the PRB pair; therefore, the base station may perform balance processing on data, and impact of a transport channel on a signal may further be reduced.

Figure 2:
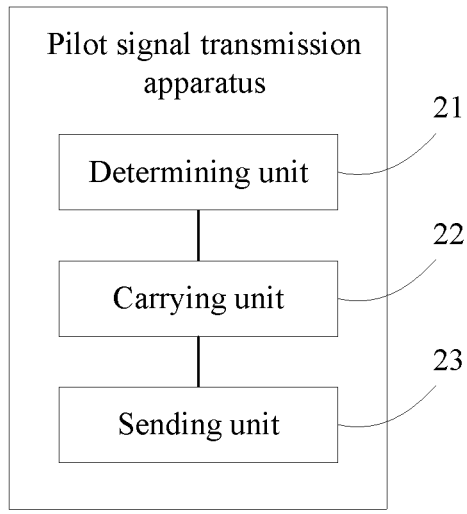
FIG. 2 is a schematic structural diagram of a pilot signal transmission apparatus according to Embodiment 1 of the present invention.

Further, in an implementation manner of the method shown in FIG. 1, this embodiment of the present invention provides a pilot signal transmission apparatus. As shown in FIG. 2, an entity of the apparatus may be user equipment, and the apparatus includes: a determining unit 21, a carrying unit 22, and a sending unit 23.

The determining unit 21 is configured to determine a physical resource block PRB pair.

A quantity of subcarriers of the PRB pair is less than 12.

The carrying unit 22 is configured to add pilot signals to the PRB pair determined by the determining unit 21.

The sending unit 23 is configured to send the pilot signals that are carried in the PRB pair by using the carrying unit 22.

It should be noted that, for other descriptions corresponding to functional units in the pilot signal transmission apparatus provided in this embodiment of the present invention, reference may be made to corresponding descriptions in FIG. 1, and details are not described herein again.

Figure 3:
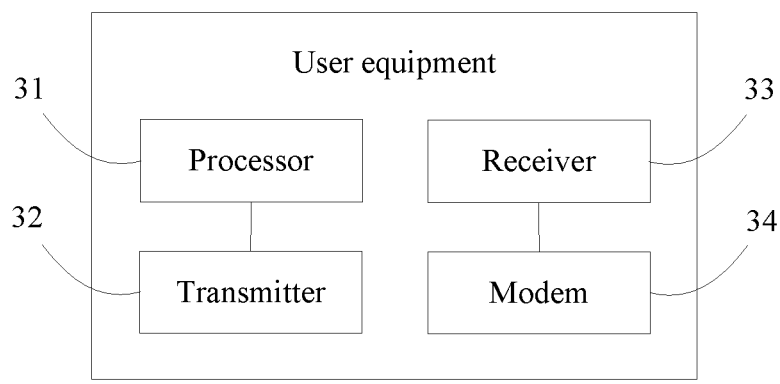
FIG. 3 is a schematic structural diagram of user equipment according to Embodiment 1 of the present invention.

Furthermore, an entity of the pilot signal transmission apparatus may be user equipment. As shown in FIG. 3, the user equipment may include: a processor 31, a transmitter 32, a receiver 33, and a modem 34, where the receiver 33 is connected to the modem 34.

The processor 31 is configured to determine a physical resource block PRB pair.

A quantity of subcarriers of the PRB pair is less than 12.

The processor 31 is further configured to add pilot signals to the PRB pair.

The transmitter 32 is configured to send the pilot signals carried in the PRB pair.

The receiver 33 is configured to receive a control signal or a data signal.

The modem 34 is configured to convert a control signal or a data signal that needs to be received by the receiver 33 into a digital modulated signal that is applicable to channel transmission.

It should be noted that, for other descriptions corresponding to devices in the user equipment provided in this embodiment of the present invention, reference may be made to corresponding descriptions in FIG. 1, and details are not described herein again.

According to the pilot signal transmission method and apparatus provided in this embodiment of the present invention, first, a PRB pair of which a quantity of subcarriers is less than 12 is determined; then, pilot signals are carried in the PRB pair; finally, the pilot signals carried in the PRB pair are sent. Compared with a current technology in which pilot signals are transmitted in a PRB pair that occupies 12 subcarriers in a frequency domain, in this embodiment of the present invention, a quantity of subcarriers of a PRB pair is decreased, and corresponding pilot signals are transmitted in the PRB pair of which the quantity of subcarriers is decreased, which can increase average power spectrum density of the subcarriers. Therefore, a transmission distance of the PRB pair may be increased, and an uplink coverage range may further be enlarged.

Embodiment 2

Figure 10:
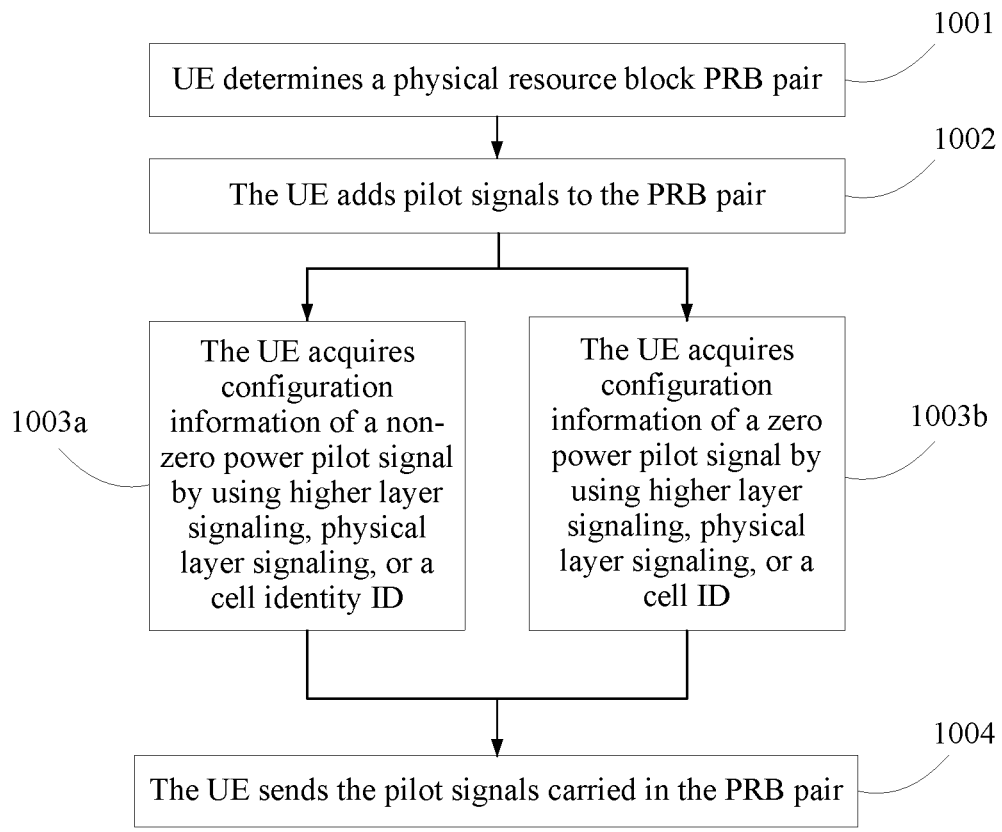
FIG. 10 is a flowchart of a pilot signal transmission method according to Embodiment 2 of the present invention.

This embodiment of the present invention provides a pilot signal transmission method. As shown in FIG. 10, the method includes the following steps:

1001. UE determines a physical resource block PRB pair.

A quantity of subcarriers of the PRB pair is less than 12. In this embodiment of the present invention, the PRB pair may be an uplink subframe in a TDD configuration.

In this embodiment of the present invention, a TDD radio frame supports seven different TDD configurations, which are specifically shown in the following table:

| TDD configuration index | Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 5 ms | D | S | U | U | U | D | D | D | D | D |
| 4 | 5 ms | D | S | U | U | D | D | D | D | D | D |
| 5 | 5 ms | D | S | U | D | D | D | D | D | D | D |
| 6 | 5 ms | D | S | U | U | U | D | S | U | U | D |

For example, when the TDD configuration index is 1, according to the method provided in this embodiment of the present invention, the PRB pair may be the uplink subframe 2, the uplink subframe 3, the uplink subframe 7, or the uplink subframe 8; when the TDD configuration index is 4, according to the method provided in this embodiment of the present invention, the PRB pair may be the uplink subframe 2 or the uplink subframe 3.

In this embodiment of the present invention, a quantity of pilot single carrier frequency division multiple access SC-FDMA symbols of the PRB pair is greater than 2. In this embodiment of the present invention, the pilot SC-FDMA symbols are used to carry pilot signals.

A product of the quantity of subcarriers of the PRB pair and the quantity of SC-FDMA symbols of the PRB pair is a preset fixed value. In this embodiment of the present invention, after the quantity of subcarriers of the PRB pair is decreased in a frequency domain, the quantity of SC-FDMA symbols needs to be increased in a time domain accordingly, so as to keep a total quantity of REs in the PRB pair unchanged.

Specifically, as shown in FIG. 4, if the quantity of subcarriers of the PRB pair is 12, the quantity of SC-FDMA symbols of the PRB pair is 14, where the PRB pair includes two slots (slot), and each slot is corresponding to seven SC-FDMA symbols. When the quantity of subcarriers of the PRB pair is less than 12, as shown in FIG. 5, if the quantity of subcarriers of the PRB pair is 6, the quantity of SC-FDMA symbols of the PRB pair is 28, where the PRB pair includes two slots, and each slot is corresponding to 14 SC-FDMA symbols; further, as shown in FIG. 6, if the quantity of subcarriers of the PRB pair is 3, the quantity of SC-FDMA symbols of the PRB pair is 56, where the PRB pair includes two slots, and each slot is corresponding to 28 SC-FDMA symbols.

1002. The UE adds pilot signals to the PRB pair.

In this embodiment of the present invention, when the quantity of subcarriers of the PRB pair is less than 12, a corresponding pilot structure needs to be adjusted accordingly when the UE adds the pilot signals to the PRB pair. Specifically, as shown in FIG. 7, if the quantity of subcarriers of the PRB pair is 12, the UE adds pilot signals to REs that are corresponding to black squares in the figure. When the quantity of subcarriers of the PRB pair is less than 12, as shown in FIG. 8, if the quantity of subcarriers of the PRB pair is 6, the UE adds pilot signals to REs that are corresponding to black squares in the figure; further, as shown in FIG. 9, if the quantity of subcarriers of the PRB pair is 3, the UE adds pilot signals to REs that are corresponding to black squares in the figure.

In this embodiment of the present invention, when the quantity of subcarriers of the PRB pair is less than 12, a corresponding pilot sequence needs to be adjusted accordingly when the UE adds the pilot signals to the PRB pair. Specifically, if the quantity of subcarriers of the PRB pair is 12, a pilot sequence length corresponding to the pilot signals in the PRB pair is 12. When the quantity of subcarriers of the PRB pair is less than 12, if the quantity of subcarriers of the PRB pair is 6, a pilot sequence length corresponding to the pilot signals in the PRB pair is 6; if the quantity of subcarriers of the PRB pair is 3, a pilot sequence length corresponding to the pilot signals in the PRB pair is 3.

Optionally, step 1002 may be that the UE may add the pilot signals to the PRB pair according to a first pilot structure.

Pilot SC-FDMA symbols corresponding to the first pilot structure are not adjacent to each other, that is, the first pilot structure is a distributed pilot structure. Specifically, the pilot SC-FDMA symbols of the first pilot structure may be distributed in the entire time domain at a same interval.

In this embodiment of the present invention, when the PRB pair has a relatively long span in the time domain, and when channel estimation is performed by using the pilot signals that are sent according to the first pilot structure, channel estimation can be more accurately performed on a time-variant channel because the pilot signals scatter in the entire time domain, so that accuracy of channel estimation can be improved.

For example, as shown in FIG. 8, when the quantity of subcarriers of the PRB pair is 6, the PRB pair occupies 28 SC-FDMA symbols in the time domain. In this case, the pilot signals in the PRB pair occupy two pilot SC-FDMA symbols in each slot, and occupy four pilot SC-FDMA symbols in the entire time domain, where these pilot SC-FDMA symbols are a $4^{th}$, an $11^{th}$, an $18^{th}$, and a $25^{th}$ SC-FDMA symbols of the PRB pair.

For another example, as shown in FIG. 9, when the quantity of subcarriers of the PRB pair is 3, the PRB pair occupies 56 SC-FDMA symbols in the time domain. In this case, the pilot signals in the PRB pair occupy four pilot SC-FDMA symbols in each slot, and occupy eight pilot SC-FDMA symbols in the entire time domain, where these pilot SC-FDMA symbols are a $4^{th}$, an $11^{th}$, an $18^{th}$, a $25^{th}$, a $32^{nd}$, a $39^{th}$, a $46^{th}$, and a $53^{rd}$ SC-FDMA symbols of the PRB pair.

Alternatively, step 1002 may further be that the UE may add the pilot signals to the PRB pair according to a second pilot structure.

The second pilot structure is corresponding to N groups of pilot SC-FDMA symbols, pilot SC-FDMA symbols in each of the N groups of pilot SC-FDMA symbols are adjacent to each other, and N is an integer greater than or equal to 1; that is, the second pilot structure is a centralized pilot structure. Specifically, each group of pilot SC-FDMA symbols may be sent in an intermediate part of the group of SC-FDMA symbols.

In this embodiment of the present invention, when channel estimation is performed by using the pilot signals that are sent according to the second pilot structure, because the pilot SC-FDMA symbols in each of the N groups of pilot SC-FDMA symbols are adjacent to each other, it may be considered that channels corresponding to the pilot SC-FDMA symbols are almost unchanged, so that pilot signals sent by user equipments are orthogonal on a same pilot SC-FDMA symbol, and interference between the user equipments can further be reduced.

Figure 13:
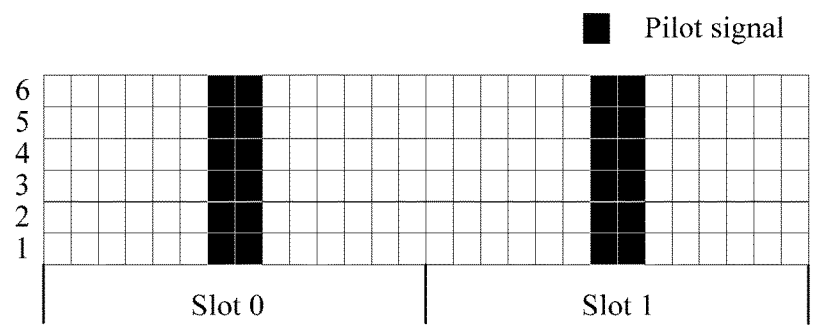
FIG. 13 is a schematic structural diagram of a PRB pair according to Embodiment 2 of the present invention.

For example, when the quantity of subcarriers of the PRB pair is 6, the pilot signals may be allocated to two groups of pilot SC-FDMA symbols. As shown in FIG. 13, the pilot SC-FDMA symbols corresponding to the pilot signals are a $7^{th}$, an $8^{th}$, a $21^{st}$, and a $22^{nd}$ SC-FDMA symbols.

Figure 14:
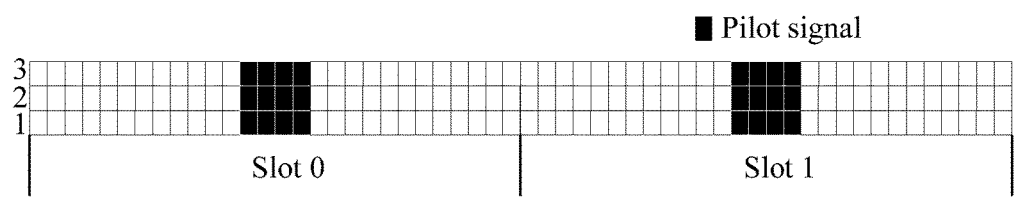
FIG. 14 is a schematic structural diagram of a PRB pair according to Embodiment 2 of the present invention.
Figure 15:
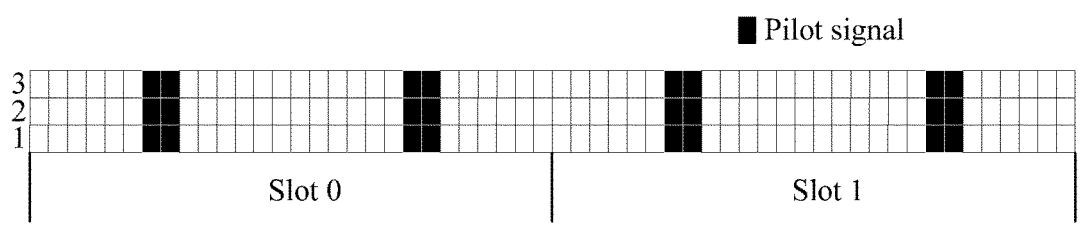
FIG. 15 is a schematic structural diagram of a PRB pair according to Embodiment 2 of the present invention.

For another example, when the quantity of subcarriers of the PRB pair is 3, the pilot signals may be allocated to two groups of pilot SC-FDMA symbols or four groups of pilot SC-FDMA symbols. As shown in FIG. 14, when the pilot signals are allocated to two groups of pilot SC-FDMA symbols, the pilot SC-FDMA symbols corresponding to the pilot signals are a $13^{th}$, a $14^{th}$, a $15^{th}$, a $16^{th}$, a $41^{st}$, a $42^{nd}$, a $43^{rd}$, and a $44^{th}$ SC-FDMA symbols. As shown in FIG. 15, when the pilot signals are allocated to four groups of pilot SC-FDMA symbols, the pilot SC-FDMA symbols corresponding to the pilot signals are a $7^{th}$, an $8^{th}$, a $21^{st}$ a $22^{nd}$ a $35^{th}$, a $36^{th}$ a $49^{th}$, and a $50^{th}$ SC-FDMA symbols.

In this embodiment of the present invention, step 1002 may further be that the UE may add the pilot signals to the PRB pair according to a pilot sequence of the PRB pair. The pilot sequence of the PRB pair may be a truncated ZC sequence, an orthogonal sequence, or a two-dimensional time-frequency orthogonal sequence.

Specifically, when the quantity of subcarriers of the PRB pair is 12, a corresponding ZC sequence is shown in the following table:

| Sequence U | ZC sequence φ(0) | φ(1) | φ(2) | φ(3) | φ(4) | φ(5) | φ(6) | φ(7) | φ(8) | φ(9) | φ(10) | φ(11) |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | −1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

U is a sequence number corresponding to each sequence in the ZC sequence; φ(0), and φ(1), . . . , and φ(11) are pilot sequences that are corresponding to sequence numbers and that are in the ZC sequence. Specifically, values corresponding to φ(0), φ(1), . . . , and φ(11) are separately sent on REs corresponding to different subcarriers on pilot SC-FDMA symbols that are in the PRB pair and that are used to send pilot signals.

In this embodiment of the present invention, if the quantity of subcarriers of the PRB pair is less than 12, a ZC sequence corresponding to a PRB pair of which a quantity of subcarriers is 12 may be truncated according to the quantity of subcarriers of the current PRB pair, so as to acquire a pilot sequence corresponding to the current PRB pair. For example, when the quantity of subcarriers of the PRB pair is 6, the ZC sequence corresponding to the PRB pair of which a quantity of subcarriers is 12 may be truncated into two segments of an equal length. Specifically, a ZC sequence 0 corresponding to the PRB pair of which a quantity of subcarriers is 12 may be truncated into two segments of an equal length, which are separately used as a ZC sequence 0 and a ZC sequence 1 that are corresponding to the PRB pair of which a quantity of subcarriers is 6. In this embodiment of the present invention, a truncated ZC sequence corresponding to the PRB pair of which a quantity of subcarriers is 6 may be shown in the following table:

| Sequence U | Truncated ZC sequence φ(0) | φ(1) | φ(2) | φ(3) | φ(4) | φ(5) |
|---|---|---|---|---|---|---|
| 0 | −1 | 1 | 3 | −3 | 3 | 3 |
| 1 | 1 | 1 | 3 | 1 | −3 | 3 |
| 2 | 1 | 1 | 3 | 3 | 3 | −1 |
| 3 | 1 | −3 | −3 | 1 | −3 | 3 |
| 4 | 1 | 1 | −3 | −3 | −3 | −1 |
| 5 | −3 | −3 | 1 | −3 | 1 | −1 |
| 6 | −1 | 1 | 1 | 1 | 1 | −1 |
| 7 | −3 | −3 | 1 | −3 | 3 | −1 |
| 8 | −1 | 3 | 1 | −1 | 1 | −1 |
| 9 | −3 | −1 | 1 | −1 | 1 | 3 |
| 10 | 1 | −3 | 3 | −1 | −1 | 1 |
| 11 | 1 | −1 | −1 | 3 | −3 | 1 |
| 12 | −1 | 3 | −3 | −3 | −3 | 3 |
| 13 | 1 | −1 | 3 | 3 | −3 | 1 |
| 14 | −3 | −1 | −1 | −1 | 1 | −3 |
| 15 | 3 | −1 | 1 | −3 | 3 | −1 |
| 16 | 1 | −3 | 3 | 1 | −1 | −1 |
| 17 | −1 | 1 | 1 | 3 | −1 | 1 |
| 18 | 1 | −3 | −1 | 3 | 3 | −1 |
| 19 | −3 | 1 | 1 | 1 | 1 | 1 |
| 20 | −1 | 3 | −1 | 1 | 1 | −3 |
| 21 | −3 | −1 | −3 | −3 | 3 | −1 |
| 22 | 3 | 1 | −1 | −1 | 3 | 3 |
| 23 | −3 | 1 | 3 | 1 | 3 | 3 |
| 24 | 1 | −3 | 1 | 1 | −3 | 1 |
| 25 | 1 | 1 | −3 | −3 | −3 | 1 |
| 26 | 3 | 3 | −3 | 3 | −3 | 1 |
| 27 | 1 | 3 | −1 | −3 | 3 | 3 |
| 28 | −3 | 1 | −1 | −3 | −1 | 3 |
| 29 | 1 | 3 | 3 | 3 | −1 | 1 |
| 30 | 3 | −1 | 1 | −3 | −1 | −1 |
| 31 | 1 | 1 | 3 | −1 | 1 | −3 |
| 32 | 1 | 3 | 1 | −1 | 1 | 3 |
| 33 | 3 | 3 | −1 | −1 | 3 | −1 |
| 34 | −3 | 1 | 1 | 3 | −3 | −3 |
| 35 | −3 | −3 | 3 | 1 | 3 | −1 |
| 36 | −3 | 3 | 1 | 1 | −3 | 1 |
| 37 | −3 | −3 | −1 | −1 | 1 | −3 |
| 38 | −1 | 3 | 1 | 3 | 1 | −1 |
| 39 | −1 | 3 | −3 | −1 | −3 | −1 |
| 40 | −1 | −3 | 1 | 1 | 1 | 1 |
| 41 | 3 | 1 | −1 | 1 | −3 | −1 |

-continued

| Sequence | Truncated ZC sequence | | | | | |
|---|---|---|---|---|---|---|
| U | φ(0) | φ(1) | φ(2) | φ(3) | φ(4) | φ(5) |
| 42 | −1 | 3 | −1 | 1 | −3 | −3 |
| 43 | −3 | −3 | −3 | 1 | −1 | −3 |
| 44 | 1 | 1 | −3 | −3 | −3 | −3 |
| 45 | −1 | 3 | −3 | 1 | −3 | 3 |
| 46 | 1 | 1 | −1 | −3 | −1 | −3 |
| 47 | 1 | −1 | 1 | 3 | −1 | 1 |
| 48 | 1 | 1 | 3 | 1 | 3 | 3 |
| 49 | −1 | 1 | −1 | −3 | −3 | 1 |
| 50 | 1 | −3 | 3 | 3 | 1 | 3 |
| 51 | 3 | 1 | −3 | −1 | −1 | 3 |
| 52 | 1 | 3 | −3 | −3 | 3 | −3 |
| 53 | 1 | −1 | −1 | 3 | −1 | −3 |
| 54 | −3 | −1 | −3 | −1 | −3 | 3 |
| 55 | 1 | −1 | 1 | 3 | −3 | −3 |
| 56 | −1 | 3 | −3 | 3 | −1 | 3 |
| 57 | 3 | −3 | 3 | 3 | −1 | −1 |
| 58 | 3 | −3 | −3 | −1 | −1 | −3 |
| 59 | −1 | 3 | −3 | 3 | 1 | −1 |

U is a sequence number corresponding to each sequence in the truncated ZC sequence; φ(0), φ(1), . . . , and φ(5) are pilot sequences that are corresponding to sequence numbers and that are in the truncated ZC sequence. Specifically, values corresponding to φ(0), φ(1), . . . , and φ(5) are separately sent on REs corresponding to different subcarriers on pilot SC-FDMA symbols that are in the PRB pair and that are used to send pilot signals.

In this embodiment of the present invention, the pilot sequence of the PRB pair may further be an orthogonal sequence. In this embodiment of the present invention, the pilot sequence of the PRB pair is sent according to that a corresponding pilot sequence is the orthogonal sequence, which can reduce interference between user equipments.

For example, when the quantity of subcarriers of the PRB pair is 3, a length of the pilot sequence is 3; in this case, a corresponding orthogonal sequence may be as follows:

| Sequence index | Orthogonal sequence |
|---|---|
| 0 | {1 1 1} |
| 1 | {1 $e^{j2\pi/3}$ $e^{j4\pi/3}$} |
| 2 | {1 $e^{j4\pi/3}$ $e^{j2\pi/3}$} |

Optionally, when a length corresponding to a pilot signal in each slot of the PRB pair is L, spread spectrum may be performed by using a group of orthogonal sequences in the time domain, where a length of each orthogonal sequence is 12/L, so as to form a two-dimensional time-frequency orthogonal sequence corresponding to the PRB pair.

Specifically, in each RE occupied by the pilot signal in each slot of the PRB pair, an orthogonal sequence of a length of 12/L is sent on each subcarrier of the subcarriers of the PRB pair, so as to implement spread spectrum by using the orthogonal sequence of a length of 12/L in the time domain.

Alternatively, when a length corresponding to a pilot signal in each slot of the PRB pair is L, spread spectrum may be performed by using a group of orthogonal sequences in the frequency domain, where a length of each orthogonal sequence is L, so as to form a two-dimensional time-frequency orthogonal sequence corresponding to the PRB pair.

Specifically, in each RE occupied by the pilot signal in each slot of the PRB pair, an orthogonal sequence of a length of L is sent on each pilot SC-FDMA symbol of the pilot SC-FDMA symbols of the PRB pair, so as to implement spread spectrum by using the orthogonal sequence of a length of L in the frequency domain.

Further, optionally, when a length corresponding to a pilot signal in each slot of the PRB pair is L, spread spectrum may be performed by using a group of orthogonal sequences in a time-frequency domain, where a length of each orthogonal sequence is 12, so as to form a two-dimensional time-frequency orthogonal sequence corresponding to the PRB pair.

Specifically, in each RE occupied by the pilot signal in each slot of the PRB pair, the pilot signal is sent according to an order of the subcarriers, so as to form a N×(12/N) two-dimensional time-frequency orthogonal sequence; or the pilot signal is sent according to an order of the pilot SC-FDMA symbols, so as to form a (12/N)×N two-dimensional time-frequency orthogonal sequence.

1003a. The UE acquires configuration information of a non-zero power pilot signal by using higher layer signaling, physical layer signaling, or a cell identity ID.

The configuration information may include information such as a pattern index of the pilot signal, a pilot sequence index, or a cyclic shift value of the pilot sequence.

In this embodiment of the present invention, the pilot signals include a non-zero power pilot signal and a zero power pilot signal, where the zero power pilot signal means that a power of the pilot signal is zero. In this embodiment of the present invention, different UEs may send non-zero power pilot signals on different pilot SC-FDMA symbols of the PRB pair, which can implement that the pilot signals sent in the PRB pair by the UEs are mutually orthogonal to each other, so that interference between the UEs may further be reduced.

Optionally, the UE may send a non-zero power pilot signal on a particular pilot SC-FDMA of pilot SC-FDMA symbols in each slot of the PRB pair, and send a zero power pilot signal on another pilot SC-FDMA of the pilot SC-FDMA symbols in each slot of the PRB pair, where the zero power pilot signal means that a power of the pilot signal is zero, or may be understood as not sending the pilot signal.

Figure 16:
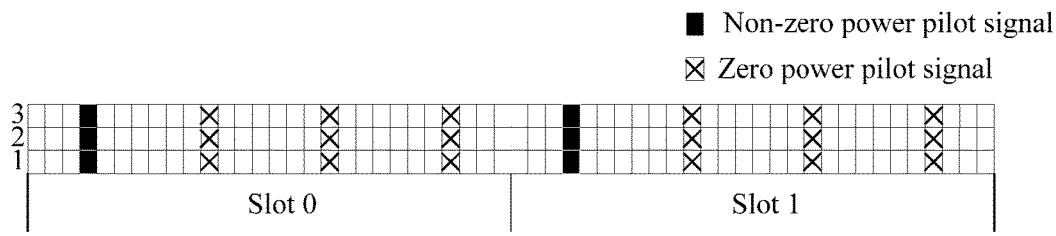
FIG. 16 is a schematic structural diagram of a PRB pair according to Embodiment 2 of the present invention.
Figure 17:
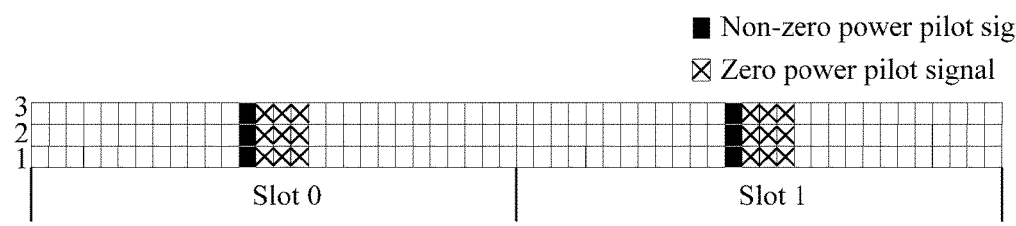
FIG. 17 is a schematic structural diagram of a PRB pair according to Embodiment 2 of the present invention.
Figure 18:
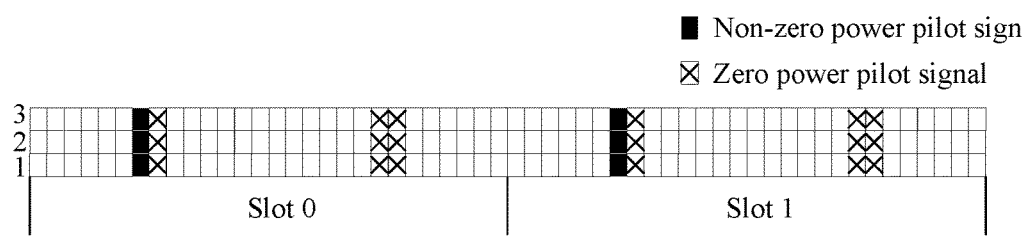
FIG. 18 is a schematic structural diagram of a PRB pair according to Embodiment 2 of the present invention.

For example, if the quantity of subcarriers of the PRB pair is 3, when the user equipment sends the pilot signals according to the first pilot structure of the PRB pair, as shown in FIG. 16, the user equipment sends non-zero power pilot signals on a $4^{th}$ and a $32^{nd}$ pilot SC-FDMA symbols of the PRB pair, and sends zero power pilot signals on an $11^{th}$, an $18^{th}$, a $25^{th}$, a $39^{th}$, a $46^{th}$, and a $53^{rd}$ SC-FDMA symbols of the PRB pair. When the user equipment sends the pilot signals according to the second pilot structure, and allocates the pilot signals to two groups of pilot SC-FDMA symbols, as shown in FIG. 17, the user equipment sends non-zero power pilot signals on a $13^{th}$ and a $41^{st}$ pilot SC-FDMA symbols of the PRB pair, and sends zero power pilot signals on a $14^{th}$, a $15^{th}$, a $16^{th}$, a $42^{nd}$, a $43^{rd}$, a $44^{th}$ SC-FDMA symbols of the PRB pair. When the user equipment sends the pilot signals according to the second pilot structure, and allocates the pilot signals to four groups of pilot SC-FDMA symbols, as shown in FIG. 18, the user equipment sends non-zero power pilot signals on a $7^{th}$ and a $35^{th}$ pilot SC-FDMA symbols of the PRB pair, and sends zero power pilot signals on an $8^{th}$, a $21^{st}$ a $22^{nd}$ a $36^{th}$ a $49^{th}$, and a $50^{th}$ SC-FDMA symbols of the PRB pair.

Alternatively, the UE may select, from REs corresponding to pilot SC-FDMA symbols in each slot of the PRB pair, some REs in any pattern according to a length of a non-zero power pilot signal, send non-zero power pilot signals on the some REs, and send zero power pilot signals on other REs of the REs corresponding to the pilot SC-FDMA symbols in each slot of the PRB pair.

Figure 19:
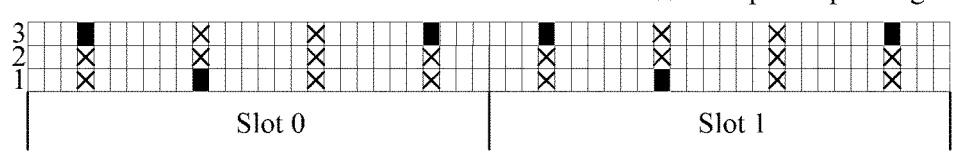
FIG. 19 is a schematic structural diagram of a PRB pair according to Embodiment 2 of the present invention.
Figure 20:
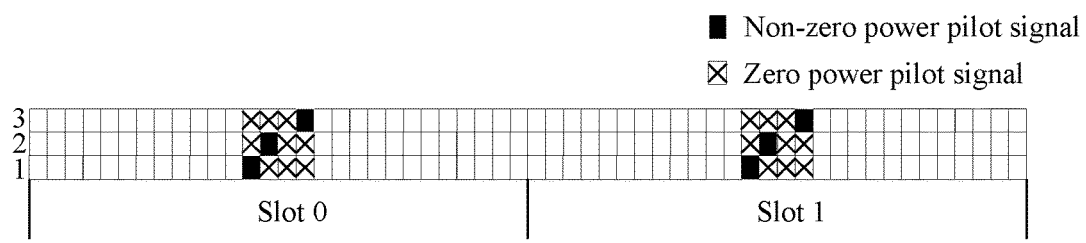
FIG. 20 is a schematic structural diagram of a PRB pair according to Embodiment 2 of the present invention.
Figure 21:
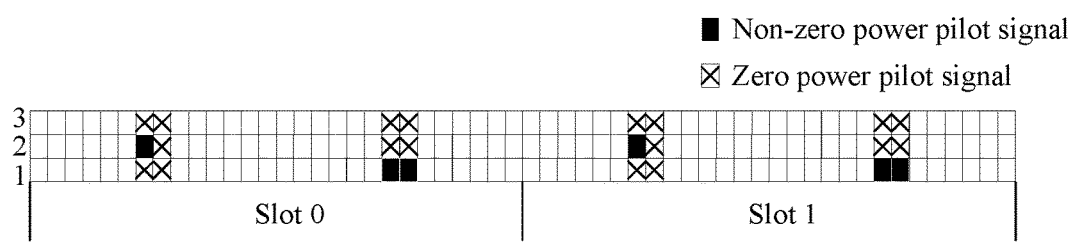
FIG. 21 is a schematic structural diagram of a PRB pair according to Embodiment 2 of the present invention.

For example, the quantity of subcarriers of the PRB pair is 3, and the length of the non-zero power pilot signal is 3. When the user equipment sends the pilot signals according to the first pilot structure of the PRB pair, as shown in FIG. 19, the user equipment sends non-zero power pilot signals on a $3^{rd}$ RE of a $4^{th}$ SC-FDMA symbol, a $1^{st}$ RE of an $11^{th}$ SC-FDMA symbol, a $3^{rd}$ RE of a $25^{th}$ SC-FDMA symbol, a $3^{rd}$ RE of a $32^{nd}$ SC-FDMA symbol, a $1^{st}$ RE of a $39^{th}$ SC-FDMA symbol, and a $3^{rd}$ RE of a $53^{rd}$ SC-FDMA symbol that are of the PRB pair, and sends zero power pilot signals on other REs of the pilot SC-FDMA symbols of the PRB pair. When the user equipment sends the pilot signals according to the second pilot structure of the PRB pair, and allocates the pilot signals to two groups of pilot SC-FDMA symbols, as shown in FIG. 20, the user equipment sends non-zero power pilot signals on a $1^{st}$ RE of a $13^{th}$ SC-FDMA symbol, a $2^{nd}$ RE of a $14^{th}$ SC-FDMA symbol, a $3^{rd}$ RE of a $16^{th}$ SC-FDMA symbol, a $1^{st}$ RE of a $41^{st}$ SC-FDMA symbol, a $2^{nd}$ RE of a $42^{nd}$ SC-FDMA symbol, and a $3^{rd}$ RE of a $44^{st}$ SC-FDMA symbol that are of the PRB pair, and sends zero power pilot signals on other REs of the pilot SC-FDMA symbols of the PRB pair. When the user equipment sends the pilot signals according to the second pilot structure of the PRB pair, and allocates the pilot signals to four groups of pilot SC-FDMA symbols, as shown in FIG. 21, the user equipment sends non-zero power pilot signals on a $2^{nd}$ RE of a $7^{th}$ SC-FDMA symbol, a $1^{st}$ RE of a $21^{st}$ SC-FDMA symbol, a $1^{st}$ RE of a $22^{nd}$ SC-FDMA symbol, a $2^{nd}$ RE of a $35^{st}$ SC-FDMA symbol, a $1^{st}$ RE of a $49^{th}$ SC-FDMA symbol, and a $1^{st}$ RE of a $50^{st}$ SC-FDMA symbol that are of the PRB pair, and sends zero power pilot signals on other REs of the pilot SC-FDMA symbols of the PRB pair.

In this embodiment of the present invention, a base station may configure the configuration information of the non-zero power pilot signal in advance, and send, to the UE, the higher layer signaling that carries the configuration information or the physical layer signaling that carries the configuration information, so that the UE can acquire the configuration information of the non-zero power pilot signal. In this embodiment of the present invention, the UE may further acquire the configuration information of the non-zero power pilot signal by using the cell ID (identity).

Specifically, the UE may acquire the configuration information of the non-zero power pilot signal by using a formula n=(n_cellID)mod m where n is a configuration index for sending the non-zero power pilot signal, n_cellID is the cell ID, and m is a total quantity of configurations for sending the non-zero power pilot signal.

For example, the quantity of subcarriers of the PRB pair is 3, and the length of the non-zero power pilot signal is 3. When the non-zero power pilot signal is sent on a particular pilot SC-FDMA of the SC-FDMA symbols, and UEs send same orthogonal sequences, the configuration information of the non-zero power pilot signal may be acquired by using a formula n=(n_cellID)mod 4. The total quantity of configurations for sending the non-zero power pilot signal is 4, that is, a configuration for sending the non-zero power pilot signal is that a same pilot sequence of a length of 3 is separately sent on four pilot SC-FDMA symbols that are corresponding to pilot signals.

For another example, the quantity of subcarriers of the PRB pair is 3, and the length of the non-zero power pilot signal is 3. When the non-zero power pilot signal is sent on a particular pilot SC-FDMA of the pilot SC-FDMA symbols, and UEs send different orthogonal sequences according to the following table, the configuration information of the non-zero power pilot signal may be acquired by using a formula n=(n_cellID) mod 12. The total quantity of configurations for sending the non-zero power pilot signal is 12, that is, a configuration for sending the non-zero power pilot signal is that three groups of pilot sequences that are mutually orthogonal to each other are separately sent on four pilot SC-FDMA symbols corresponding to pilot signals, where a length of each pilot sequence is 3.

| Sequence index | Orthogonal sequence |
|---|---|
| 0 | {1 1 1} |
| 1 | {1 $e^{j2\pi/3}$ $e^{j4\pi/3}$} |
| 2 | {1 $e^{j4\pi/3}$ $e^{j2\pi/3}$} |

A value of the sequence n is 0, 1, 2, ..., or 11, and the sequence n is corresponding to different pilot SC-FDMA symbol indexes and different sequence indexes when being different values, and a specific correspondence is shown in the following table:

| Sequence number n | Sequence index | Pilot SC-FDMA symbol index |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |

Preferably, the UE sends, on any pilot SC-FDMA symbol of the pilot SC-FDMA symbols of the PRB pair, the non-zero power pilot signal in the PRB pair to the base station; or the UE sends, on any subcarrier of the subcarriers of the PRB pair, the non-zero power pilot signal in the PRB pair to the base station. In this embodiment of the present invention, the non-zero power pilot signal in the PRB pair is sent on any pilot SC-FDMA symbol of the pilot SC-FDMA symbols or any subcarrier of the subcarriers, which can reduce complexity of the configuration information.

In step 1003b that is parallel to step 1003a, the UE acquires configuration information of a zero power pilot signal by using higher layer signaling, physical layer signaling, or a cell ID.

A base station may configure the configuration information of the zero power pilot signal in advance, and send, to the UE, higher layer signaling that carries the configuration information or physical layer signaling that carries the configuration information, so that the UE can acquire the configuration information of the zero power pilot signal. In this embodiment of the present invention, the UE may further acquire the configuration information of the non-zero power pilot signal by using the cell ID.

Specifically, the UE may acquire the configuration information of the zero power pilot signal by using a formula n=(n_cellID)mod m, where n is a configuration index for sending the zero power pilot signal, n_cellID is the cell ID, and m is a total quantity of configurations for sending the zero power pilot signal.

For example, the quantity of subcarriers of the PRB pair is 3, and a length of the non-zero power pilot signal is 3. When the zero power pilot signal is sent on a particular pilot SC-FDMA of the pilot SC-FDMA symbols, and UEs send same orthogonal sequences, the configuration information of the zero power pilot signal may be acquired by using a formula n=(n_cellID) mod 4. The total quantity of configurations for sending the zero power pilot signal is 4, that is, a configuration for sending the zero power pilot signal is that a same pilot sequence of a length of 3 is separately sent on four pilot SC-FDMA symbols that are corresponding to pilot signals.

For another example, the quantity of subcarriers of the PRB pair is 3, and a length of the non-zero power pilot signal is 3. When the zero power pilot signal is sent on a particular pilot SC-FDMA of the pilot SC-FDMA symbols, and UEs send different orthogonal sequences according to the following table, the configuration information of the zero power pilot signal may be acquired by using a formula n=(n_cellID) mod 12. The total quantity of configurations for sending the zero power pilot signal is 12, that is, a configuration for sending the zero power pilot signal is that three groups of pilot sequences that are mutually orthogonal to each other are separately sent on four pilot SC-FDMA symbols corresponding to pilot signals, where a length of each pilot sequence is 3.

| Sequence index | Orthogonal sequence |
|---|---|
| 0 | $\{1\ 1\ 1\}$ |
| 1 | $\{1\ e^{j2\pi/3}\ e^{j4\pi/3}\}$ |
| 2 | $\{1\ e^{j4\pi/3}\ e^{j2\pi/3}\}$ |

A value of the sequence n is 0, 1, 2, . . . , or 11, and the sequence n is corresponding to different pilot SC-FDMA symbol indexes and different sequence indexes when being different values, and a specific correspondence is shown in the following table:

| Sequence number n | Sequence index | Pilot SC-FDMA symbol index |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |

Preferably, the UE sends, on any pilot SC-FDMA symbol of the pilot SC-FDMA symbols of the PRB pair, the zero power pilot signal in the PRB pair to the base station; or the UE sends, on any subcarrier of the subcarriers of the PRB pair, the zero power pilot signal in the PRB pair to the base station. In this embodiment of the present invention, the zero power pilot signal in the PRB pair is sent on any pilot SC-FDMA symbol of the pilot SC-FDMA symbols or any subcarrier of the subcarriers, which can reduce complexity of the configuration information.

1004. The UE sends the pilot signals carried in the PRB pair.

In this embodiment of the present invention, a PRB pair that carries pilot signals is sent to a base station, so that the base station can acquire the pilot signals from the received PRB pair, and perform channel estimation according to the pilot signals in the PRB pair; therefore, the base station may perform balance processing on data, and impact of a transport channel on a signal may further be reduced.

In this embodiment of the present invention, when a requirement on a single carrier characteristic is relatively low, the pilot signals may be completely distributed in the time domain of the PRB pair. When the requirement on the single carrier characteristic is relatively low, a pilot signal and a data signal may be simultaneously sent on each SC-FDMA symbol of the SC-FDMA symbols of the PRB pair. In this embodiment of the present invention, the pilot signals are completely distributed in the time domain of the PRB pair, which can implement that pilot signal sending is not affected by the quantity of subcarriers of the PRB pair. Therefore, flexibility of pilot signal sending may be improved.

Figure 22:
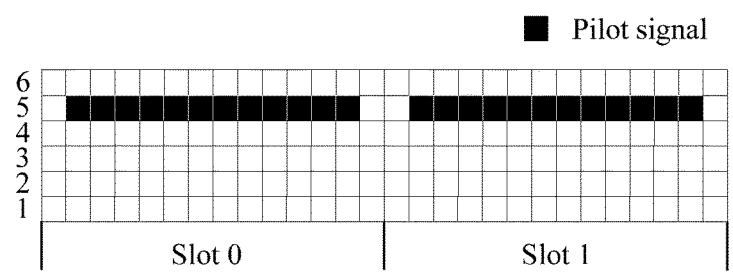
FIG. 22 is a schematic structural diagram of a PRB pair according to Embodiment 2 of the present invention.
Figure 23:
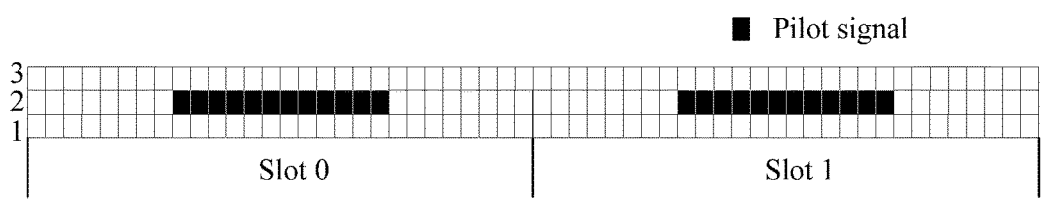
FIG. 23 is a schematic structural diagram of a PRB pair according to Embodiment 2 of the present invention.

For example, when the quantity of subcarriers of the PRB pair is 6, as shown in FIG. 22, the pilot signals in the PRB pair may be sent on a $5^{th}$ subcarrier. For another example, when the quantity of subcarriers of the PRB pair is 3, as shown in FIG. 23, the pilot signals in the PRB pair may be sent on a $2^{nd}$ subcarrier.

Further, the pilot signals may be completely distributed in the entire time domain of the PRB pair, that is, one subcarrier of the subcarriers of the PRB pair is selected, and the pilot signals are sent on all REs of the subcarrier. In this embodiment of the present invention, the pilot signals are completely distributed in the entire time domain of the PRB pair, which can provide resources to more UEs for pilot signal transmission.

Figure 24:
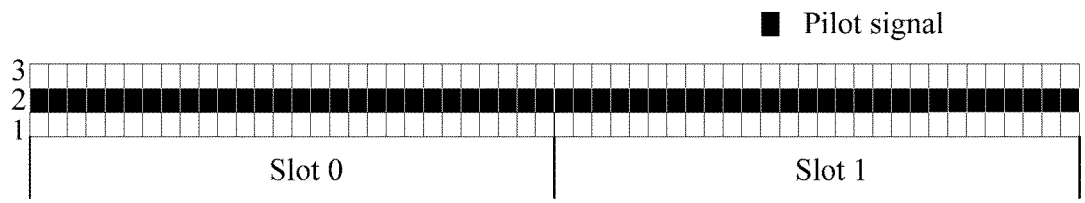
FIG. 24 is a schematic structural diagram of a PRB pair according to Embodiment 2 of the present invention.

For example, when the quantity of subcarriers of the PRB pair is 3, as shown in FIG. 24, the pilot signals in the PRB pair may be sent on all REs of a $2^{nd}$ subcarrier.

In this embodiment of the present invention, a quantity of subcarriers of a PRB pair is decreased, and corresponding pilot signals are sent in the PRB pair of which the quantity of subcarriers is decreased, which can support pilot signal sending in a narrowband system. Therefore, channel estimation may be performed by using the pilot signals when an uplink coverage range is enlarged.

In this embodiment of the present invention, pilot signals in a PRB pair are sent to a base station, so that the base station may acquire the pilot signals from the received PRB pair, and further perform channel estimation according to the pilot signals in the PRB pair.

Figure 11:
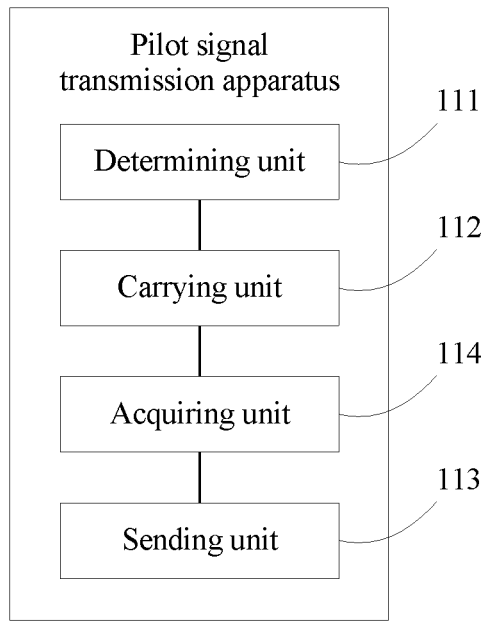
FIG. 11 is a schematic structural diagram of a pilot signal transmission apparatus according to Embodiment 2 of the present invention.

Further, in an implementation manner of the method shown in FIG. 10, this embodiment of the present invention provides a pilot signal transmission apparatus. As shown in FIG. 11, an entity of the apparatus may be user equipment, and the apparatus includes: a determining unit 111, a carrying unit 112, and a sending unit 113.

The determining unit 111 is configured to determine a physical resource block PRB pair.

A quantity of subcarriers of the PRB pair is less than 12.

The carrying unit 112 is configured to add pilot signals to the PRB pair determined by the determining unit 111.

The sending unit 113 is configured to send the pilot signals that are carried in the PRB pair by using the carrying unit 112.

A quantity of pilot single carrier frequency division multiple access SC-FDMA symbols of the PRB pair determined by the determining unit 111 is greater than 2.

The pilot SC-FDMA symbols are used to carry pilot signals.

The carrying unit 112 is specifically configured to add, according to a first pilot structure, the pilot signals to the PRB pair determined by the determining unit 111.

Pilot SC-FDMA symbols corresponding to the first pilot structure are not adjacent to each other.

The carrying unit 112 is further specifically configured to add, according to a second pilot structure, the pilot signals to the PRB pair determined by the determining unit 111.

The second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

The pilot signals added by the carrying unit 112 include a non-zero power pilot signal and a zero power pilot signal.

Optionally, the apparatus may further include an acquiring unit 114.

The acquiring unit 114 is configured to acquire configuration information of the non-zero power pilot signal by using higher layer signaling, physical layer signaling, or a cell identity ID, or the acquiring unit 114 is configured to acquire configuration information of the zero power pilot signal by using higher layer signaling, physical layer signaling, or a cell ID.

The acquiring unit 114 is specifically configured to acquire the configuration information of the non-zero power pilot signal by using a formula $n=(n\_cellID) \bmod m$, where n is a configuration index for sending the non-zero power pilot signal, n_cellID is the cell ID, and m is a total quantity of configurations for sending the non-zero power pilot signal; or the acquiring unit 114 is specifically configured to acquire the configuration information of the zero power pilot signal by using a formula $n=(n\_cellID) \bmod m$, where n is a configuration index for sending the zero power pilot signal, n_cellID is the cell ID, and m is a total quantity of configurations for sending the zero power pilot signal.

The carrying unit 112 is specifically configured to add, according to a pilot sequence of the PRB pair, the pilot signals to the PRB pair determined by the determining unit 111.

The pilot sequence of the PRB pair may be a truncated ZC sequence, an orthogonal sequence, or a two-dimensional time-frequency orthogonal sequence.

It should be noted that, for other descriptions corresponding to functional units in the pilot signal transmission apparatus provided in this embodiment of the present invention, reference may be made to corresponding descriptions in FIG. 10, and details are not described herein again.

Figure 12:
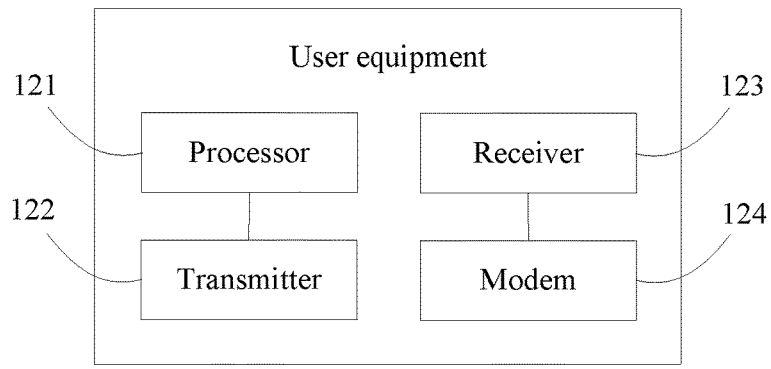
FIG. 12 is a schematic structural diagram of user equipment according to Embodiment 2 of the present invention.

Furthermore, an entity of the pilot signal transmission apparatus may be user equipment. As shown in FIG. 12, the user equipment may include: a processor 121, a transmitter 122, a receiver 123, and a modem 124, where the transmitter 122 and the receiver 123 are separately connected to the modem 1210.

The processor 121 is configured to determine a physical resource block PRB pair.

A quantity of subcarriers of the PRB pair is less than 12.

The processor 121 is further configured to add pilot signals to the PRB pair.

The transmitter 122 is configured to send the pilot signals carried in the PRB pair.

A quantity of pilot single carrier frequency division multiple access SC-FDMA symbols of the PRB pair determined by the processor 121 is greater than 2.

The pilot SC-FDMA symbols are used to carry pilot signals.

The processor 121 is further configured to add the pilot signals to the PRB pair according to a first pilot structure.

Pilot SC-FDMA symbols corresponding to the first pilot structure are not adjacent to each other.

The processor 121 is further configured to add the pilot signals to the PRB pair according to a second pilot structure.

The second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

The pilot signals added by the processor 121 include a non-zero power pilot signal and a zero power pilot signal.

The processor 121 is further configured to acquire configuration information of the non-zero power pilot signal by using higher layer signaling, physical layer signaling, or a cell identity ID; or the processor 121 is further configured to acquire configuration information of the zero power pilot signal by using higher layer signaling, physical layer signaling, or a cell ID.

The processor 121 is further configured to acquire the configuration information of the non-zero power pilot signal by using a formula $n=(n\_cellID) \bmod m$, where n is a configuration index for sending the non-zero power pilot signal, n_cellID is the cell ID, and m is a total quantity of configurations for sending the non-zero power pilot signal; or the processor 121 is further configured to acquire the configuration information of the zero power pilot signal by using a formula $n=(n\_cellID) \bmod m$, where n is a configuration index for sending the zero power pilot signal, n_cellID is the cell ID, and m is a total quantity of configurations for sending the zero power pilot signal.

The processor 121 is further configured to add the pilot signals to the PRB pair according to a pilot sequence of the PRB pair.

The pilot sequence of the PRB pair may be a truncated ZC sequence, an orthogonal sequence, or a two-dimensional time-frequency orthogonal sequence.

The receiver 123 is configured to receive a control signal or a data signal.

The modem 124 is configured to convert a control signal or a data signal that needs to be received by the receiver 123 into a digital modulated signal that is applicable to channel transmission.

It should be noted that, for other descriptions corresponding to components in the user equipment provided in this embodiment of the present invention, reference may be made to corresponding descriptions in FIG. 10, and details are not described herein again.

According to the pilot signal transmission method and apparatus provided in this embodiment of the present invention, first, a PRB pair of which a quantity of subcarriers is less than 12 is determined; then, pilot signals are carried in the PRB pair; finally, the pilot signals carried in the PRB pair are sent. Compared with a current technology in which pilot signals are transmitted in a PRB pair that occupies 12 subcarriers in a frequency domain, in this embodiment of the present invention, a quantity of subcarriers of a PRB pair is decreased, and corresponding pilot signals are transmitted in the PRB pair of which the quantity of subcarriers is decreased, which can increase average power spectrum density of the subcarriers. Therefore, a transmission distance of the PRB pair may be increased, and an uplink coverage range may further be enlarged.

Embodiment 3

Figure 25:
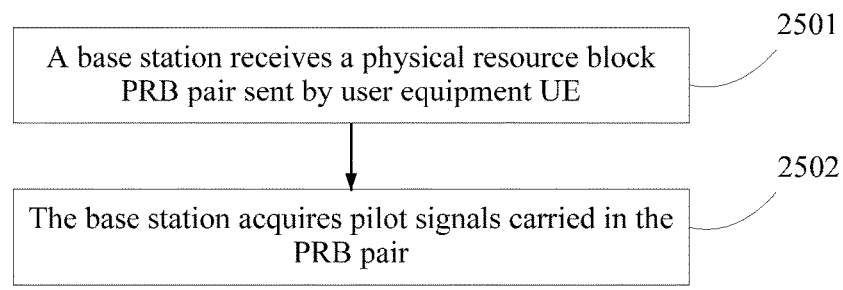
FIG. 25 is a flowchart of a pilot signal transmission method according to Embodiment 3 of the present invention.

This embodiment of the present invention provides a pilot signal transmission method. As shown in FIG. 25, the method includes the following steps:

2501. A base station receives a physical resource block PRB pair sent by user equipment UE.

A quantity of subcarriers of the PRB pair is less than 12. In this embodiment of the present invention, the PRB pair may be an uplink subframe in a TDD configuration.

2502. The base station acquires pilot signals carried in the PRB pair.

The pilot signals in the PRB pair are used to perform channel estimation.

In this embodiment of the present invention, a base station acquires pilot signals carried in a PRB pair, and performs channel estimation according to the pilot signals in the PRB pair; therefore, the base station may perform balance processing on data, and impact of a transport channel on a signal may further be reduced.

Figure 26:
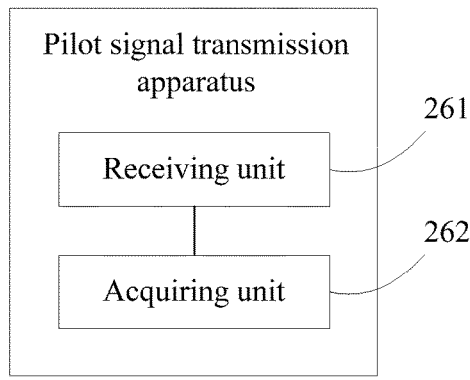
FIG. 26 is a schematic structural diagram of a pilot signal transmission apparatus according to Embodiment 3 of the present invention.

Further, in an implementation manner of the method shown in FIG. 25, this embodiment of the present invention provides a pilot signal transmission apparatus. As shown in FIG. 26, an entity of the apparatus may be a base station, and the apparatus includes a receiving unit 261 and an acquiring unit 262.

The receiving unit 261 is configured to receive a physical resource block PRB pair sent by user equipment UE.

A quantity of subcarriers of the PRB pair is less than 12.

The acquiring unit 262 is configured to acquire pilot signals carried in the PRB pair received by the receiving unit 261.

It should be noted that, for other descriptions corresponding to functional units in the pilot signal transmission apparatus provided in this embodiment of the present invention, reference may be made to corresponding descriptions in FIG. 25, and details are not described herein again.

Figure 27:
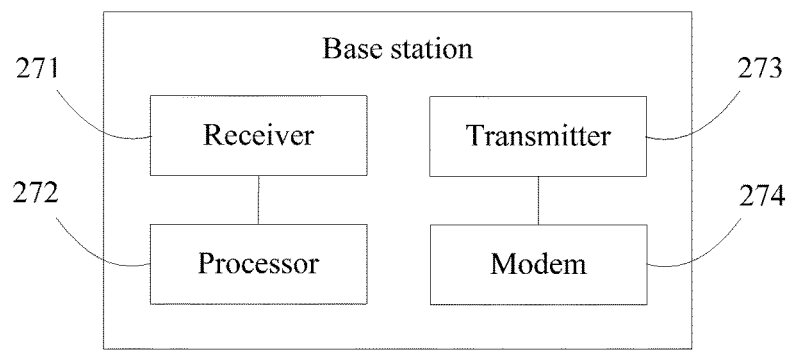
FIG. 27 is a schematic structural diagram of user equipment according to Embodiment 3 of the present invention.

Furthermore, an entity of the pilot signal transmission apparatus may be a base station. As shown in FIG. 27, the base station may include: a receiver 271, a processor 272, a transmitter 273, a modem 274, where the transmitter 273 is connected to the modem 274.

The receiver 271 is configured to receive a physical resource block PRB pair sent by user equipment UE.

A quantity of subcarriers of the PRB pair is less than 12.

The processor 272 is configured to acquire pilot signals carried in the PRB pair.

The transmitter 273 is configured to transmit a control signal or a data signal.

The modem 274 is configured to convert a control signal or a data signal that needs to be transmitted by the transmitter 273 into a digital modulated signal that is applicable to channel transmission.

It should be noted that, for other descriptions corresponding to devices in the base station provided in this embodiment of the present invention, reference may be made to corresponding descriptions in FIG. 25, and details are not described herein again.

According to the pilot signal transmission method and apparatus provided in this embodiment of the present invention, first, a PRB pair of which a quantity of subcarriers is less than 12 is determined; then, pilot signals are carried in the PRB pair; finally, the PRB pair that carries the pilot signals is sent to a base station. Compared with a current technology in which pilot signals are transmitted in a PRB pair that occupies 12 subcarriers in a frequency domain, in this embodiment of the present invention, a quantity of subcarriers of a PRB pair is decreased, and corresponding pilot signals are transmitted in the PRB pair of which the quantity of subcarriers is decreased, which can increase average power spectrum density of the subcarriers. Therefore, a transmission distance of the PRB pair may be increased, and an uplink coverage range may further be enlarged.

Embodiment 4

Figure 28:
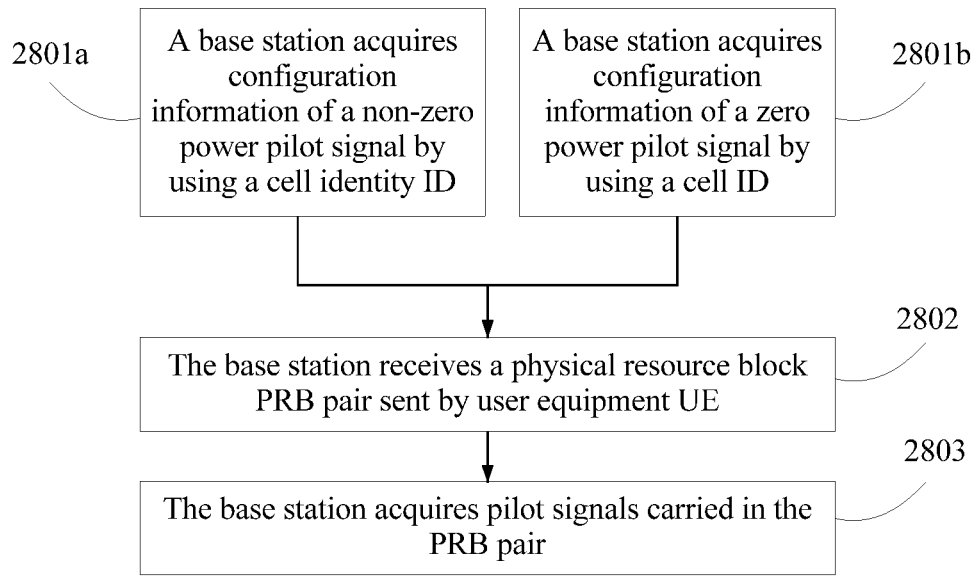
FIG. 28 is a flowchart of a pilot signal transmission method according to Embodiment 4 of the present invention.

This embodiment of the present invention provides a pilot signal transmission method. As shown in FIG. 28, the method includes the following steps:

2801*a*. A base station acquires configuration information of a non-zero power pilot signal by using a cell identity ID.

The configuration information may include information such as a pattern index of a pilot signal, a pilot sequence index, or a cyclic shift value of the pilot sequence.

In this embodiment of the present invention, pilot signals include a non-zero power pilot signal and a zero power pilot signal. In this embodiment of the present invention, different UEs may send, on different pilot SC-FDMA symbols of a PRB pair, non-zero power pilot signals with same pilot sequences, which can implement that the pilot signals sent in the PRB pair by the UEs are mutually orthogonal to each other, so that interference between the UEs may further be reduced.

Optionally, the base station may acquire a non-zero power pilot signal on a particular pilot SC-FDMA of pilot SC-FDMA symbols in each slot of the PRB pair, and acquire a zero power pilot signal on another pilot SC-FDMA of the pilot SC-FDMA symbols in each slot of the PRB pair.

Alternatively, in corresponding REs in pilot SC-FDMA symbols in each slot of the PRB pair and according to the configuration information or a preset rule, the base station may acquire a non-zero power pilot signal on an RE that sends the non-zero power pilot signal and acquire a zero power pilot signal on another RE.

In this embodiment of the present invention, the configuration information of the non-zero power pilot signal may be configured by the base station in advance, or may be acquired by the base station by using the cell ID (identity), which is not limited in this embodiment of the present invention.

Specifically, the base station may acquire the configuration information of the non-zero power pilot signal by using a formula n=(n_cellID) mod m, where n is a configuration index for sending the non-zero power pilot signal, n_cellID is the cell ID, and m is a total quantity of configurations for sending the non-zero power pilot signal.

For example, a quantity of subcarriers of the PRB pair is 3, and a length of the non-zero power pilot signal is 3. When the non-zero power pilot signal is sent on a particular pilot SC-FDMA of the pilot SC-FDMA symbols, and UEs send same orthogonal sequences, the configuration information of the non-zero power pilot signal may be acquired by using a formula n=(n_cellID)mod 4. The total quantity of configurations for sending the non-zero power pilot signal is 4, that is, a configuration for sending the non-zero power pilot signal is that a same pilot sequence of a length of 3 is separately sent on four pilot SC-FDMA symbols that are corresponding to pilot signals.

For another example, a quantity of subcarriers of the PRB pair is 3, and a length of the non-zero power pilot signal is 3. When the non-zero power pilot signal is sent on a particular pilot SC-FDMA of the pilot SC-FDMA symbols, and UEs send different orthogonal sequences according to the following table, the configuration information of the non-zero power pilot signal may be acquired by using a formula n=(n_cellID) mod 12. The total quantity of configurations for sending the non-zero power pilot signal is 12, that is, a configuration for sending the non-zero power pilot signal is that three groups of pilot sequences that are mutually orthogonal to each other are separately sent on four pilot SC-FDMA symbols corresponding to pilot signals, where a length of each pilot sequence is 3.

| Sequence index | Orthogonal sequence |
| --- | --- |
| 0 | {1 1 1} |
| 1 | {1 $e^{j2\pi/3}$ $e^{j4\pi/3}$} |
| 2 | {1 $e^{j4\pi/3}$ $e^{j2\pi/3}$} |

A value of the sequence n is 0, 1, 2, . . . , or 11, and the sequence n is corresponding to different pilot SC-FDMA symbol indexes and different sequence indexes when being different values, and a specific correspondence is shown in the following table:

| Sequence number n | Sequence index | Pilot SC-FDMA symbol index |
| --- | --- | --- |
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |

In step 2801b that is parallel to step 2801a, a base station acquires configuration information of a zero power pilot signal by using a cell ID.

The configuration information of the zero power pilot signal may be configured by the base station in advance, or may be acquired by the base station by using the cell ID.

Specifically, the base station may acquire the configuration information of the zero power pilot signal by using a formula n=(n_cellID)mod m, where n is a configuration index for sending the zero power pilot signal, n_cellID is the cell ID, and m is a total quantity of configurations for sending the zero power pilot signal.

For example, a quantity of subcarriers of the PRB pair is 3, and a length of the non-zero power pilot signal is 3. When the zero power pilot signal is sent on a particular pilot SC-FDMA of the pilot SC-FDMA symbols, and UEs send same orthogonal sequences, the configuration information of the zero power pilot signal may be acquired by using a formula n=(n_cellID)mod 4. The total quantity of configurations for sending the zero power pilot signal is 4, that is, a configuration for sending the zero power pilot signal is that a same pilot sequence of a length of 3 is separately sent on four pilot SC-FDMA symbols that are corresponding to pilot signals.

For another example, a quantity of subcarriers of the PRB pair is 3, and a length of the non-zero power pilot signal is 3. When the zero power pilot signal is sent on a particular pilot SC-FDMA of the pilot SC-FDMA symbols, and UEs send different orthogonal sequences according to the following table, the configuration information of the zero power pilot signal may be acquired by using a formula n=(n_cellID) mod 12. The total quantity of configurations for sending the zero power pilot signal is 12, that is, a configuration for sending the zero power pilot signal is that three groups of pilot sequences that are mutually orthogonal to each other are separately sent on four pilot SC-FDMA symbols corresponding to pilot signals, where a length of each pilot sequence is 3.

| Sequence index | Orthogonal sequence |
| --- | --- |
| 0 | {1 1 1} |
| 1 | {1 $e^{j2\pi/3}$ $e^{j4\pi/3}$} |
| 2 | {1 $e^{j4\pi/3}$ $e^{j2\pi/3}$} |

A value of the sequence n is 0, 1, 2, . . . , or 11, and the sequence n is corresponding to different pilot SC-FDMA symbol indexes and different sequence indexes when being different values, and a specific correspondence is shown in the following table:

| Sequence number n | Sequence index | Pilot SC-FDMA symbol index |
| --- | --- | --- |
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |

In step 2801b that is parallel to step 2801a, a base station acquires configuration information of a zero power pilot signal by using a cell ID.

The configuration information of the zero power pilot signal may be configured by the base station in advance, or may be acquired by the base station by using the cell ID.

Specifically, the base station may acquire the configuration information of the zero power pilot signal by using a formula n=(n_cellID) mod m where n is a configuration index for sending the zero power pilot signal, n_cellID is the cell ID, and m is a total quantity of configurations for sending the zero power pilot signal.

Optionally, step 2801a may further be that a base station sends, to UE, higher layer signaling that carries configuration information of a non-zero power pilot signal or physical layer signaling that carries configuration information of the non-zero power pilot signal.

In this embodiment of the present invention, the base station sends, to the UE, the higher layer signaling that carries the configuration information of the non-zero power pilot signal or the physical layer signaling that carries the configuration information of the non-zero power pilot signal, so that the UE can acquire the configuration information of the non-zero power pilot signal by using the higher layer signaling or the physical layer signaling.

Optionally, step 2801b may further be that a base station sends, to UE, higher layer signaling that carries configuration information of a zero power pilot signal or physical layer signaling that carries configuration information of the zero power pilot signal.

In this embodiment of the present invention, the base station sends, to the UE, the higher layer signaling that carries the configuration information of the zero power pilot signal or the physical layer signaling that carries the configuration information of the zero power pilot signal, so that the UE can acquire the configuration information of the zero power pilot signal by using the higher layer signaling or the physical layer signaling.

2802. The base station receives a physical resource block PRB pair sent by user equipment UE.

A quantity of subcarriers of the PRB pair is less than 12. In this embodiment of the present invention, the PRB pair may be an uplink subframe in a TDD configuration.

In this embodiment of the present invention, a quantity of pilot single carrier frequency division multiple access SC-FDMA symbols of the PRB pair is greater than 2. In this embodiment of the present invention, the pilot SC-FDMA symbols are used to carry pilot signals.

A product of the quantity of subcarriers of the PRB pair and the quantity of pilot SC-FDMA symbols of the PRB pair is a preset fixed value. In this embodiment of the present invention, after the quantity of subcarriers of the PRB pair is decreased in a frequency domain, the quantity of pilot SC-FDMA symbols needs to be increased in a time domain accordingly, so as to keep a total quantity of REs in the PRB pair unchanged.

2803. The base station acquires pilot signals carried in the PRB pair.

In this embodiment of the present invention, a base station acquires pilot signals carried in a PRB pair, and performs channel estimation according to the pilot signals in the PRB pair; therefore, the base station may perform balance processing on data, and impact of a transport channel on a signal may further be reduced.

Optionally, step 2803 may be that the base station acquires, according to a first pilot structure, the pilot signals carried in the PRB pair.

Pilot SC-FDMA symbols corresponding to the first pilot structure are not adjacent to each other, that is, the first pilot structure is a distributed pilot structure. Specifically, the pilot SC-FDMA symbols of the first pilot structure may be distributed in the entire time domain at a same interval.

In this embodiment of the present invention, when the PRB pair has a relatively long span in the time domain, and when channel estimation is performed by using the pilot signals that are sent according to the first pilot structure, channel estimation can be more accurately performed on a time-variant channel because the pilot signals scatter in the entire time domain, so that accuracy of channel estimation can be improved.

For example, as shown in FIG. 8, when the quantity of subcarriers of the PRB pair is 6, the PRB pair occupies 28 SC-FDMA symbols in the time domain. In this case, the pilot signals in the PRB pair occupy two pilot SC-FDMA symbols in each slot, and occupy four pilot SC-FDMA symbols in the entire time domain, where these pilot SC-FDMA symbols are a $4^{th}$, an $11^{th}$, an $18^{th}$, and a $25^{th}$ SC-FDMA symbols of the PRB pair.

For another example, as shown in FIG. 9, when the quantity of subcarriers of the PRB pair is 3, the PRB pair occupies 56 SC-FDMA symbols in the time domain; in this case, the pilot signals in the PRB pair occupy four pilot SC-FDMA symbols in each slot, and occupy eight pilot SC-FDMA symbols in the entire time domain, where these pilot SC-FDMA symbols are a $4^{th}$, an $11^{th}$, an $18^{th}$, a $25^{th}$, a $32^{nd}$, a $39^{th}$, a $46^{th}$, and a $53^{rd}$ SC-FDMA symbols of the PRB pair.

Alternatively, step 2803 may further be that the base station acquires, according to a second pilot structure, the pilot signals carried in the PRB pair.

The second pilot structure is corresponding to N groups of pilot SC-FDMA symbols, pilot SC-FDMA symbols in each of the N groups of pilot SC-FDMA symbols are adjacent to each other, and N is an integer greater than or equal to 1; that is, the second pilot structure is a centralized pilot structure. Specifically, each group of pilot SC-FDMA symbols may be sent in an intermediate part of the group of SC-FDMA symbols.

In this embodiment of the present invention, when channel estimation is performed by using the pilot signals that are sent according to the second pilot structure, because the pilot SC-FDMA symbols in each of the N groups of pilot SC-FDMA symbols are adjacent to each other, channels corresponding to the pilot SC-FDMA symbols are almost unchanged, so that pilot signals sent by user equipments are orthogonal on a same pilot SC-FDMA symbol, and interference between the user equipments can further be reduced.

For example, when the quantity of subcarriers of the PRB pair is 6, the pilot signals may be allocated to two groups of pilot SC-FDMA symbols. As shown in FIG. 13, the pilot SC-FDMA symbols corresponding to the pilot signals are a $7^{th}$, an $8^{th}$, a $21^{st}$, and a $22^{nd}$ SC-FDMA symbols.

For another example, when the quantity of subcarriers of the PRB pair is 3, the pilot signals may be allocated to two groups of pilot SC-FDMA symbols or four groups of pilot SC-FDMA symbols. As shown in FIG. 14, when the pilot signals are allocated to two groups of pilot SC-FDMA symbols, the pilot SC-FDMA symbols corresponding to the pilot signals are a $13^{th}$, a $14^{th}$, a $15^{th}$, a $16^{th}$, a $41^{st}$, a $42^{nd}$, a $43^{rd}$, and a $44^{th}$ SC-FDMA symbols. As shown in FIG. 15, when the pilot signals are allocated to four groups of pilot SC-FDMA symbols, the pilot SC-FDMA symbols corresponding to the pilot signals are a $7^{th}$, an $8^{th}$, a $21^{st}$ a $22^{nd}$ a $35^{th}$, a $36^{th}$, a $49^{th}$, and a $50^{th}$ SC-FDMA symbols.

In this embodiment of the present invention, step 2803 may further be that the base station acquires, according to a pilot sequence of the PRB pair, the pilot signals carried in the PRB pair. The pilot sequence of the PRB pair may be a truncated ZC sequence, an orthogonal sequence, or a two-dimensional time-frequency orthogonal sequence.

For corresponding descriptions of the truncated ZC sequence, reference may be made to the corresponding descriptions of the truncated ZC sequence in Embodiment 2.

In this embodiment of the present invention, the pilot sequence of the PRB pair may further be an orthogonal sequence. In this embodiment of the present invention, the pilot sequence of the PRB pair is sent according to that a corresponding pilot sequence is the orthogonal sequence, which can reduce interference between user equipments.

For example, when the quantity of subcarriers of the PRB pair is 3, a length of the pilot sequence is 3; in this case, a corresponding orthogonal sequence may be as follows:

| Sequence index | Orthogonal sequence |
| --- | --- |
| 0 | {1 1 1} |
| 1 | {1 $e^{j2\pi/3}$ $e^{j4\pi/3}$} |
| 2 | {1 $e^{j4\pi/3}$ $e^{j2\pi/3}$} |

Optionally, when a length corresponding to a pilot signal in each slot of the PRB pair is L, spread spectrum may be performed by using a group of orthogonal sequences in the time domain, where a length of each orthogonal sequence is 12/L, so as to form a two-dimensional time-frequency orthogonal sequence corresponding to the PRB pair.

Specifically, in each RE occupied by the pilot signal in each slot of the PRB pair, an orthogonal sequence of a length of 12/L is sent on each subcarrier of the subcarriers of the PRB pair, so as to implement spread spectrum by using the orthogonal sequence of a length of 12/L in the time domain.

Alternatively, when a length corresponding to a pilot signal in each slot of the PRB pair is L, spread spectrum may be performed by using a group of orthogonal sequences in the frequency domain, where a length of each orthogonal sequence is L, so as to form a two-dimensional time-frequency orthogonal sequence corresponding to the PRB pair.

Specifically, in each RE occupied by the pilot signal in each slot of the PRB pair, an orthogonal sequence of a length of L is sent on each pilot SC-FDMA symbol of the pilot SC-FDMA symbols of the PRB pair, so as to implement spread spectrum by using the orthogonal sequence of a length of L in the frequency domain.

Further, optionally, when a length corresponding to a pilot signal in each slot of the PRB pair is L, spread spectrum may be performed by using a group of orthogonal sequences in a time-frequency domain, where a length of each orthogonal sequence is 12, so as to form a two-dimensional time-frequency orthogonal sequence corresponding to the PRB pair.

Specifically, in each RE occupied by the pilot signal in each slot of the PRB pair, the pilot signal is sent according to an order of the subcarriers, so as to form a N×(12/N) two-dimensional time-frequency orthogonal sequence; or the pilot signal is sent according to an order of the pilot SC-FDMA symbols, so as to form a (12/N)×N two-dimensional time-frequency orthogonal sequence.

In this embodiment of the present invention, when a requirement on a single carrier characteristic is relatively low, the pilot signals may be completely distributed in the time domain of the PRB pair. When the requirement on the single carrier characteristic is relatively low, a pilot signal and a data signal may be simultaneously sent on each SC-FDMA symbol of the SC-FDMA symbols of the PRB pair. In this embodiment of the present invention, the pilot signals are completely distributed in the time domain of the PRB pair, which can implement that pilot signal sending is not affected by the quantity of subcarriers of the PRB pair. Therefore, flexibility of pilot signal sending may be improved.

For example, when the quantity of subcarriers of the PRB pair is 6, as shown in FIG. 22, the pilot signals in the PRB pair may be sent on a $5^{th}$ subcarrier. For another example, when the quantity of subcarriers of the PRB pair is 3, as shown in FIG. 23, the pilot signals in the PRB pair may be sent on a $2^{nd}$ subcarrier.

Further, the pilot signals may be completely distributed in the entire time domain of the PRB pair, that is, one subcarrier of the subcarriers of the PRB pair is selected, and the pilot signals are sent on all REs of the subcarrier. In this embodiment of the present invention, the pilot signals are completely distributed in the entire time domain of the PRB pair, which can provide resources to more UEs for pilot signal transmission.

For example, when the quantity of subcarriers of the PRB pair is 3, as shown in FIG. 24, the pilot signals in the PRB pair may be sent on all REs of a $2^{nd}$ subcarrier.

In this embodiment of the present invention, a quantity of subcarriers of a PRB pair is decreased, and corresponding pilot signals are sent in the PRB pair of which the quantity of subcarriers is decreased, which can support pilot signal sending in a narrowband system. Therefore, channel estimation may be performed by using the pilot signals when an uplink coverage range is enlarged.

Figure 29:
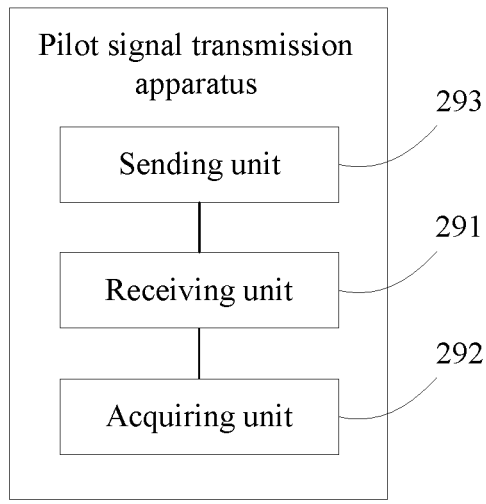
FIG. 29 is a schematic structural diagram of a pilot signal transmission apparatus according to Embodiment 4 of the present invention.

Further, in an implementation manner of the method shown in FIG. 28, this embodiment of the present invention provides a pilot signal transmission apparatus. As shown in FIG. 29, an entity of the apparatus may be a base station, and the apparatus includes a receiving unit 291 and an acquiring unit 292.

The receiving unit 291 is configured to receive a physical resource block PRB pair sent by user equipment UE.

A quantity of subcarriers of the PRB pair is less than 12.

The acquiring unit 292 is configured to acquire pilot signals carried in the PRB pair received by the receiving unit 291.

A quantity of pilot single carrier frequency division multiple access SC-FDMA symbols of the PRB pair received by the receiving unit 291 is greater than 2.

The pilot SC-FDMA symbols are used to carry pilot signals.

The acquiring unit 292 is specifically configured to acquire, according to a first pilot structure, the pilot signals carried in the PRB pair received by the receiving unit 291.

Pilot SC-FDMA symbols corresponding to the first pilot structure are not adjacent to each other.

The acquiring unit 292 is further specifically configured to acquire, according to a second pilot structure, the pilot signals carried in the PRB pair received by the receiving unit 291.

The second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

The pilot signals acquired by the acquiring unit 292 include a non-zero power pilot signal and a zero power pilot signal.

Optionally, the apparatus may further include a sending unit 293.

The sending unit 293 is configured to send, to the UE, higher layer signaling that carries configuration information of the non-zero power pilot signal or physical layer signaling that carries configuration information of the non-zero power pilot signal; or the sending unit 293 is configured to send, to the UE, higher layer signaling that carries configuration information of the zero power pilot signal or physical layer signaling that carries configuration information of the zero power pilot signal.

The acquiring unit 292 is further configured to acquire the configuration information of the non-zero power pilot signal by using a cell identity ID; or the acquiring unit 292 is further configured to acquire the configuration information of the zero power pilot signal by using a cell ID.

The acquiring unit 292 is specifically configured to acquire the configuration information of the non-zero power pilot signal by using a formula n=(n_cellID)mod m, where n is a configuration index for sending the non-zero power pilot signal, n_cellID is the cell ID, and m is a total quantity of configurations for sending the non-zero power pilot signal; or the acquiring unit 292 is specifically configured to acquire the configuration information of the zero power pilot signal by using a formula n=(n_cellID)mod m, where n is a configuration index for sending the zero power pilot signal, n_cellID is the cell ID, and m is a total quantity of configurations for sending the zero power pilot signal.

The acquiring unit 292 is specifically configured to acquire, according to a pilot structure of the PRB pair, the pilot signals carried in the PRB pair received by the receiving unit 291.

The pilot sequence of the PRB pair may be a truncated ZC sequence, an orthogonal sequence, or a two-dimensional time-frequency orthogonal sequence.

It should be noted that, for other descriptions corresponding to functional units in the pilot signal transmission apparatus provided in this embodiment of the present invention, reference may be made to corresponding descriptions in FIG. 28, and details are not described herein again.

Figure 30:
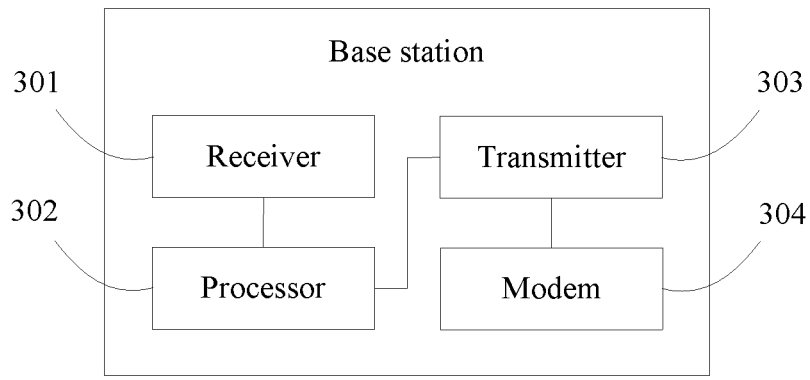
FIG. 30 is a schematic structural diagram of user equipment according to Embodiment 4 of the present invention.

Furthermore, an entity of the pilot signal transmission apparatus may be a base station. As shown in FIG. 30, the base station may include: a receiver 301, a processor 302, and a transmitter 303.

The receiver 301 is configured to receive a physical resource block PRB pair sent by user equipment UE.

A quantity of subcarriers of the PRB pair is less than 12.

The processor 302 is configured to acquire pilot signals carried in the PRB pair.

A quantity of pilot single carrier frequency division multiple access SC-FDMA symbols of the PRB pair received by the receiver 301 is greater than 2.

The pilot SC-FDMA symbols are used to carry pilot signals.

The processor 302 is further configured to acquire, according to a first pilot structure, the pilot signals carried in the PRB pair.

Pilot SC-FDMA symbols corresponding to the first pilot structure are not adjacent to each other.

The processor 302 is further configured to acquire, according to a second pilot structure, the pilot signals carried in the PRB pair.

The second pilot structure is corresponding to N groups of pilot SC-FDMA symbols, pilot SC-FDMA symbols in each of the N groups of pilot SC-FDMA symbols are adjacent to each other, and N is an integer greater than or equal to 1.

The pilot signals acquired by the processor 302 include a non-zero power pilot signal and a zero power pilot signal.

The transmitter 303 is configured to send, to the UE, higher layer signaling that carries configuration information of the non-zero power pilot signal or physical layer signaling that carries configuration information of the non-zero power pilot signal; or the transmitter 303 is configured to send, to the UE, higher layer signaling that carries configuration information of the zero power pilot signal or physical layer signaling that carries configuration information of the zero power pilot signal.

The processor 302 is further configured to acquire the configuration information of the non-zero power pilot signal by using a cell identity ID; or the processor 302 is further configured to acquire the configuration information of the zero power pilot signal by using a cell ID.

The processor 302 is further configured to acquire the configuration information of the non-zero power pilot signal by using a formula n=(n_cellID)mod m, where n is a configuration index for sending the non-zero power pilot signal, n_cellID is the cell ID, and m is a total quantity of configurations for sending the non-zero power pilot signal; or the processor 302 is further configured to acquire the configuration information of the zero power pilot signal by using a formula n=(n_cellID) mod m, where n is a configuration index for sending the zero power pilot signal, n_cellID is the cell ID, and m is a total quantity of configurations for sending the zero power pilot signal.

The processor 302 is further configured to acquire, according to a pilot sequence of the PRB pair, the pilot signals carried in the PRB pair.

The pilot sequence of the PRB pair may be a truncated ZC sequence, an orthogonal sequence, or a two-dimensional time-frequency orthogonal sequence.

The transmitter 303 is further configured to transmit a control signal or a data signal.

A modem 304 is configured to convert a control signal or a data signal that needs to be transmitted by the transmitter 303 into a digital modulated signal that is applicable to channel transmission.

It should be noted that, for other descriptions corresponding to devices in the base station provided in this embodiment of the present invention, reference may be made to corresponding descriptions in FIG. 28, and details are not described herein again.

According to the pilot signal transmission method and apparatus provided in this embodiment of the present invention, first, a PRB pair of which a quantity of subcarriers is less than 12 is determined; then, pilot signals are carried in the PRB pair; finally, the PRB pair that carries the pilot signals is sent to a base station. Compared with a current technology in which pilot signals are transmitted in a PRB pair that occupies 12 subcarriers in a frequency domain, in this embodiment of the present invention, a quantity of subcarriers of a PRB pair is decreased, and corresponding pilot signals are transmitted in the PRB pair of which the quantity of subcarriers is decreased, which can increase average power spectrum density of the subcarriers. Therefore, a transmission distance of the PRB pair may be increased, and an uplink coverage range may further be enlarged.

Embodiment 5

Figure 31:
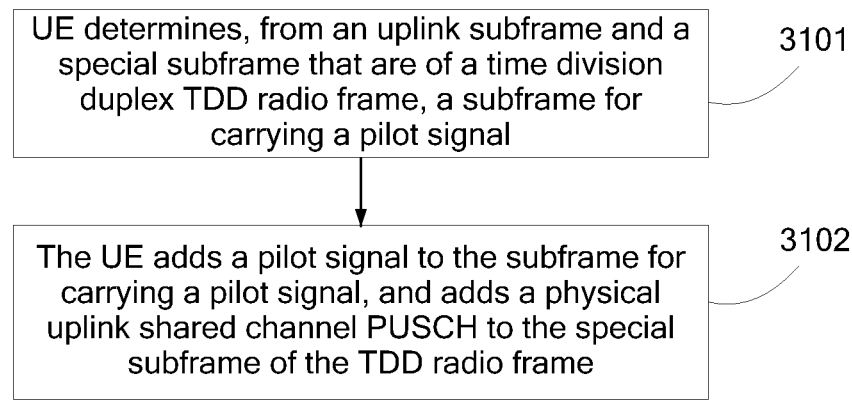
FIG. 31 is a flowchart of a pilot signal transmission method according to Embodiment 5 of the present invention.

This embodiment of the present invention provides a pilot signal transmission method. As shown in FIG. 31, the method includes the following steps:

3101. UE determines, from an uplink subframe and a special subframe that are of a time division duplex TDD radio frame, a subframe for carrying a pilot signal.

The subframe for carrying a pilot signal is a special subframe of the TDD radio frame or an uplink subframe that is after and adjacent to the special subframe. In this embodiment of the present invention, the TDD radio frame supports seven different TDD configurations, which are specifically shown in the following table:

| TDD configuration index | Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 5 ms | D | S | U | U | U | D | D | D | D | D |
| 4 | 5 ms | D | S | U | U | D | D | D | D | D | D |
| 5 | 5 ms | D | S | U | D | D | D | D | D | D | D |
| 6 | 5 ms | D | S | U | U | U | D | S | U | U | D |

D represents a downlink subframe, S represents a special subframe, and U represents an uplink subframe.

For example, when the TDD configuration index is 1, according to the method provided in this embodiment of the present invention, the subframe for sending a pilot signal may be the special subframe 1, the uplink subframe 2, the special subframe 6, or the uplink subframe 7; when the TDD configuration index is 4, according to the method provided in this embodiment of the present invention, the subframe for sending a pilot signal may be the special subframe 1 or the uplink subframe 2.

Specifically, as shown in FIG. 34, a special subframe in the TDD configuration includes three special slots, which are DwPTS, GP, and UpPTS. DwPTS is used to send a downlink signal; UpPTS is used to send an uplink signal; GP is a guard period for uplink-downlink conversion performed in the TDD radio frame. In this embodiment of the present invention, a pilot signal may be sent in UpPTS of the special subframe.

3102. The UE adds a pilot signal to the subframe for carrying a pilot signal, and adds a physical uplink shared channel PUSCH to a special subframe of the TDD radio frame.

Specifically, when the subframe for carrying a pilot signal is the special subframe in the TDD configuration, the UE sends the PUSCH on another SC-FDMA symbol except an SC-FDMA symbol that is in UpPTS of the special subframe and for sending a pilot signal. When the subframe for carrying a pilot signal is the uplink subframe that is after and adjacent to the special subframe, the UE sends the PUSCH in UpPTS of the special subframe.

Figure 32:
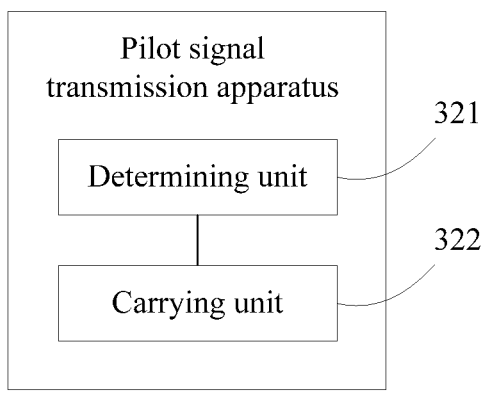
FIG. 32 is a schematic structural diagram of a pilot signal transmission apparatus according to Embodiment 5 of the present invention.

Further, in an implementation manner of the method shown in FIG. 31, this embodiment of the present invention provides a pilot signal transmission apparatus. As shown in FIG. 32, an entity of the apparatus may be user equipment, and the apparatus includes a determining unit 321 and a carrying unit 322.

The determining unit 321 is configured to determine, from an uplink subframe and a special subframe that are of a time division duplex TDD radio frame, a subframe for carrying a pilot signal.

The subframe for carrying a pilot signal is a special subframe of the TDD radio frame or an uplink subframe that is after and adjacent to the special subframe.

The carrying unit 322 is configured to: add a pilot signal to the subframe that is determined by the determining unit 321 and for carrying a pilot signal, and add a physical uplink shared channel PUSCH to the special subframe of the TDD radio frame.

It should be noted that, for other descriptions corresponding to functional units in the pilot signal transmission apparatus provided in this embodiment of the present invention, reference may be made to corresponding descriptions in FIG. 31, and details are not described herein again.

Furthermore, an entity of the pilot signal transmission apparatus may be user equipment. As shown in FIG. 33, the user equipment may include: a processor 331, a transmitter 332, a receiver 333, and a modem 334, where the transmitter 332 and the receiver 333 are connected to the modem 334.

The processor 331 is configured to determine, from an uplink subframe and a special subframe that are of a time division duplex TDD radio frame, a subframe for carrying a pilot signal.

The subframe for carrying a pilot signal is a special subframe of the TDD radio frame or an uplink subframe that is after and adjacent to the special subframe.

The processor 331 is further configured to: add a pilot signal to the subframe for carrying a pilot signal, and add a physical uplink shared channel PUSCH to the special subframe of the TDD radio frame.

The transmitter 332 is configured to transmit a control signal or a data signal.

The receiver 333 is configured to receive a control signal or a data signal.

The modem 334 is configured to: convert a control signal or a data signal that needs to be transmitted by the transmitter 332 into a digital modulated signal that is applicable to channel transmission, and convert a control signal or a data signal that needs to be received by the receiver 333 into a digital modulated signal that is applicable to channel transmission.

It should be noted that, for other descriptions corresponding to components in the user equipment provided in this embodiment of the present invention, reference may be made to corresponding descriptions in FIG. 31, and details are not described herein again.

According to the pilot signal transmission method and apparatus provided in this embodiment of the present invention, first, in an uplink subframe and a special subframe that are of a TDD radio frame, a special subframe of the TDD radio frame or an uplink subframe that is after and adjacent to the special subframe is determined as a subframe for carrying a pilot signal; then, a pilot signal is carried in the subframe for carrying a pilot signal, and a PUSCH (Physical Uplink Shared Channel, physical uplink shared channel) is carried in the special subframe of the TDD radio frame. Compared with a current technology in which a PUSCH is transmitted in a common subframe in a TDD configuration, in this embodiment of the present invention, a data signal is transmitted in UpPTS of a special subframe in the TDD configuration, which can increase resources for data signal transmission. Therefore, a transmission distance of a data signal may be increased, and an uplink coverage range may further be enlarged.

Embodiment 6

This embodiment of the present invention provides a pilot signal transmission method. As shown in FIG. 35, the method includes the following steps:

3501. UE determines, from an uplink subframe and a special subframe that are of a time division duplex TDD radio frame, a subframe for carrying a pilot signal.

The subframe for carrying a pilot signal is a special subframe of the TDD radio frame or an uplink subframe that is after and adjacent to the special subframe. In this embodiment of the present invention, the TDD radio frame supports seven different TDD configurations, which are specifically shown in the following table:

| TDD configuration index | Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 5 ms | D | S | U | U | U | D | D | D | D | D |
| 4 | 5 ms | D | S | U | U | D | D | D | D | D | D |
| 5 | 5 ms | D | S | U | D | D | D | D | D | D | D |
| 6 | 5 ms | D | S | U | U | U | D | S | U | U | D |

D represents a downlink subframe, S represents a special subframe, and U represents an uplink subframe.

For example, when the TDD configuration index is 2, according to the method provided in this embodiment of the present invention, the subframe for sending a pilot signal may be the special subframe 1, the uplink subframe 2, the special subframe 6, or the uplink subframe 7; when the TDD configuration index is 6, according to the method provided in this embodiment of the present invention, the subframe for sending a pilot signal may be the special subframe 1, the uplink subframe 2, the special subframe 6, or the uplink subframe 7.

Specifically, as shown in FIG. 34, a special subframe in the TDD configuration includes three special slots, which are DwPTS, GP, and UpPTS. DwPTS is used to send a downlink signal; UpPTS is used to send an uplink signal; GP is a guard period for uplink-downlink conversion performed in the TDD radio frame. In this embodiment of the present invention, a pilot signal may be sent in UpPTS of the special subframe.

3502. The UE adds a pilot signal to the subframe for carrying a pilot signal, and adds a physical uplink shared channel PUSCH to a special subframe of the TDD radio frame.

Optionally, step 3501 may be that the UE determines the special subframe of the TDD radio frame as the subframe for carrying a pilot signal. In this case, step 3502 may be that the UE adds the pilot signal to a preset single carrier frequency division multiple access SC-FDMA symbol of the special subframe, and adds the PUSCH on another SC-FDMA symbol of the special subframe.

The preset SC-FDMA symbol of the special subframe may be a third SC-FDMA symbol in a second slot of the special subframe. In this embodiment of the present invention, the pilot signal is sent on the third SC-FDMA symbol in the second slot of the special subframe, which can reduce operation complexity of pilot signal sending.

In this embodiment of the present invention, a pilot signal and a PUSCH are carried in UpPTS that is in a special subframe of a TDD radio frame and that is used to carry an uplink signal, which can increase resources for data signal transmission in the TDD radio frame. Therefore, a transmission distance of a data signal may be increased, and an uplink coverage range may further be enlarged.

Alternatively, step 3501 may further be that the UE determines the uplink subframe that is after and adjacent to the special subframe as the subframe for carrying a pilot signal. In this case, step 3502 may be that the UE adds the pilot signal to the uplink subframe that is after and adjacent to the special subframe, and adds the PUSCH to the special subframe.

In this embodiment of the present invention, a PUSCH is carried in entire UpPTS that is in a special subframe of a TDD radio frame and that is used to carry an uplink signal, which can further increase resources for data signal transmission in the TDD radio frame. Therefore, a transmission distance of a data signal may be increased, and an uplink coverage range may further be enlarged.

Figure 36:
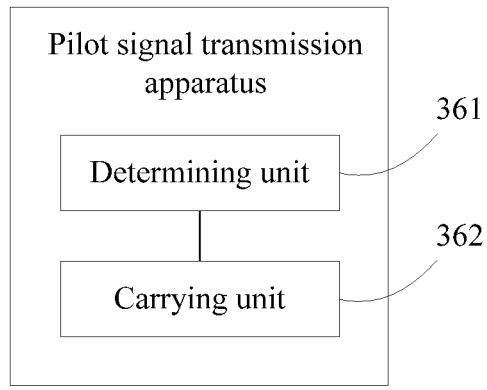
FIG. 36 is a schematic structural diagram of a pilot signal transmission apparatus according to Embodiment 6 of the present invention.

Further, in an implementation manner of the method shown in FIG. 35, this embodiment of the present invention provides a pilot signal transmission apparatus. As shown in FIG. 36, an entity of the apparatus may be user equipment, and the apparatus includes a determining unit 361 and a carrying unit 362.

The determining unit 361 is configured to determine, from an uplink subframe and a special subframe that are of a time division duplex TDD radio frame, a subframe for carrying a pilot signal.

The subframe for carrying a pilot signal is a special subframe of the TDD radio frame or an uplink subframe that is after and adjacent to the special subframe.

The carrying unit 362 is configured to: add a pilot signal to the subframe that is determined by the determining unit 361 and for carrying a pilot signal, and add a physical uplink shared channel PUSCH to the special subframe of the TDD radio frame.

The determining unit 361 is specifically configured to determine the special subframe of the TDD radio frame as the subframe for carrying a pilot signal.

The carrying unit 362 is specifically configured to: add the pilot signal to a preset single carrier frequency division multiple access SC-FDMA symbol of the special subframe determined by the determining unit 361, and add the PUSCH to another SC-FDMA symbol of the special subframe.

The preset SC-FDMA symbol of the special subframe determined by the determining unit 361 is a third SC-FDMA symbol in a second slot of the special subframe.

The determining unit 361 is further specifically configured to determine the uplink subframe that is after and adjacent to the special subframe as the subframe for carrying a pilot signal.

The carrying unit 362 is further specifically configured to: add the pilot signal to the uplink subframe that is determined by the determining unit 361 and is after and adjacent to the special subframe, and add the PUSCH to the special subframe.

It should be noted that, for other descriptions corresponding to functional units in the pilot signal transmission apparatus provided in this embodiment of the present invention, reference may be made to corresponding descriptions in FIG. 35, and details are not described herein again.

Figure 37:
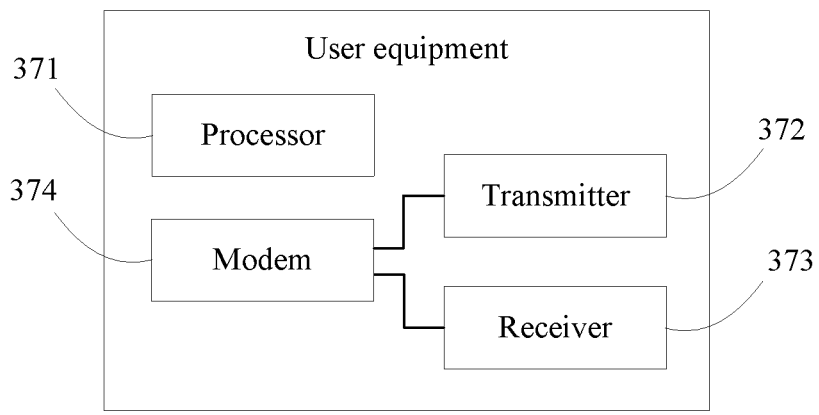
FIG. 37 is a schematic structural diagram of user equipment according to Embodiment 6 of the present invention.

Furthermore, an entity of the pilot signal transmission apparatus may be user equipment. As shown in FIG. 37, the user equipment may include: a processor 371, a transmitter 372, a receiver 373, and a modem 374, where the transmitter 372 and the receiver 373 are connected to the modem 374.

The processor 371 is configured to determine, from an uplink subframe and a special subframe that are of a time division duplex TDD radio frame, a subframe for carrying a pilot signal.

The subframe for carrying a pilot signal is a special subframe of the TDD radio frame or an uplink subframe that is after and adjacent to the special subframe.

The processor 371 is further configured to: add the pilot signal to the subframe for carrying a pilot signal, and add a physical uplink shared channel PUSCH to the special subframe of the TDD radio frame.

The processor 371 is further configured to determine the special subframe of the TDD radio frame as the subframe for carrying a pilot signal.

The processor 371 is further configured to: add the pilot signal to a preset single carrier frequency division multiple access SC-FDMA symbol of the special subframe, and add the PUSCH to another SC-FDMA symbol of the special subframe.

The preset SC-FDMA symbol of the special subframe determined by the processor 371 is a third SC-FDMA symbol in a second slot of the special subframe.

The processor 371 is further configured to determine the uplink subframe that is after and adjacent to the special subframe as the subframe for carrying a pilot signal.

The processor 371 is further configured to: add the pilot signal to the uplink subframe that is after and adjacent to the special subframe, and add the PUSCH to the special subframe.

The transmitter 372 is configured to transmit a control signal or a data signal.

The receiver 373 is configured to receive a control signal or a data signal.

The modem 374 is configured to: convert a control signal or a data signal that needs to be transmitted by the transmitter 372 into a digital modulated signal that is applicable to channel transmission, and convert a control signal or a data signal that needs to be received by the receiver 373 into a digital modulated signal that is applicable to channel transmission.

It should be noted that, for other descriptions corresponding to components in the user equipment provided in this embodiment of the present invention, reference may be made to corresponding descriptions in FIG. 35, and details are not described herein again.

According to the pilot signal transmission method and apparatus provided in this embodiment of the present invention, first, in an uplink subframe and a special subframe that are of a TDD radio frame, a special subframe of the TDD radio frame or an uplink subframe that is after and adjacent to the special subframe is determined as a subframe for carrying a pilot signal; then, a pilot signal is carried in the subframe for carrying a pilot signal, and a PUSCH (Physical Uplink Shared Channel, physical uplink shared channel) is carried in the special subframe of the TDD radio frame. Compared with a current technology in which a PUSCH is transmitted in a common subframe in a TDD configuration, in this embodiment of the present invention, a data signal is transmitted in UpPTS of a special subframe in the TDD configuration, which can increase resources for data signal transmission. Therefore, a transmission distance of a data signal may be increased, and an uplink coverage range may further be enlarged.

Embodiment 7

Figure 38:
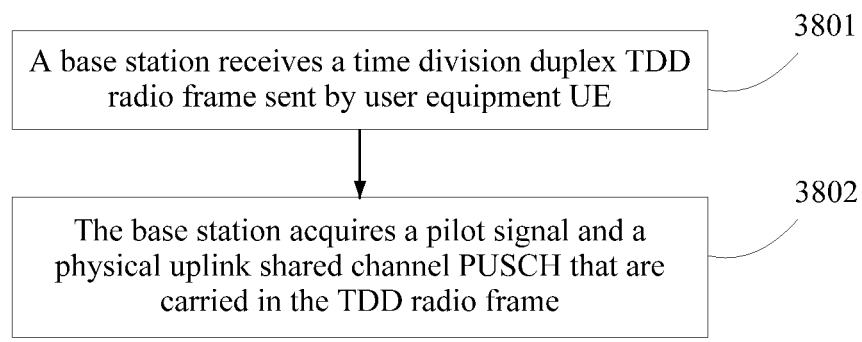
FIG. 38 is a flowchart of a pilot signal transmission method according to Embodiment 7 of the present invention.

This embodiment of the present invention provides a pilot signal transmission method. As shown in FIG. 38, the method includes the following steps:

3801. A base station receives a time division duplex TDD radio frame sent by user equipment UE.

In this embodiment of the present invention, the received TDD radio frame supports seven different TDD configurations, which are specifically shown in the following table:

| TDD configuration index | Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 5 ms | D | S | U | U | U | D | D | D | D | D |
| 4 | 5 ms | D | S | U | U | D | D | D | D | D | D |
| 5 | 5 ms | D | S | U | D | D | D | D | D | D | D |
| 6 | 5 ms | D | S | U | U | U | D | S | U | U | D |

D represents a downlink subframe, S represents a special subframe, and U represents an uplink subframe. In this embodiment of the present invention, data signals sent by the UE to the base station are sent in a special subframe and an uplink subframe.

3802. The base station acquires a pilot signal and a physical uplink shared channel PUSCH that are carried in the TDD radio frame.

Specifically, when a subframe for carrying a pilot signal is a special subframe in a TDD configuration, the base station acquires, in UpPTS of the special subframe, the pilot signal and the physical uplink shared channel PUSCH that are in the TDD configuration. When a subframe for carrying a pilot signal is an uplink subframe that is after and adjacent to the special subframe, the base station acquires, in UpPTS of the special subframe, the pilot signal and the physical uplink shared channel PUSCH that are in the TDD configuration.

Figure 39:
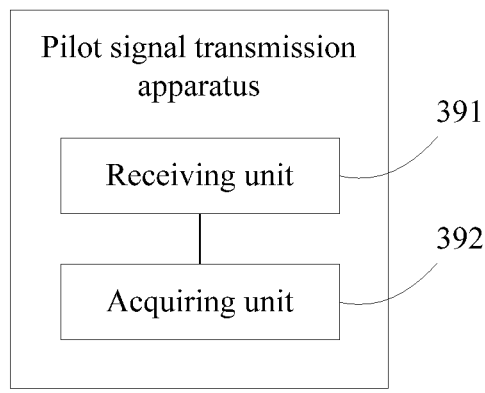
FIG. 39 is a schematic structural diagram of a pilot signal transmission apparatus according to Embodiment 7 of the present invention.

Further, in an implementation manner of the method shown in FIG. 38, this embodiment of the present invention provides a pilot signal transmission apparatus. As shown in FIG. 39, an entity of the apparatus may be a base station, and the apparatus includes a receiving unit 391 and an acquiring unit 392.

The receiving unit 391 is configured to receive a time division duplex TDD radio frame sent by user equipment UE.

The acquiring unit 392 is configured to acquire a pilot signal and a physical uplink shared channel PUSCH that are carried in the TDD radio frame received by the receiving unit 391.

It should be noted that, for other descriptions corresponding to functional units in the pilot signal transmission apparatus provided in this embodiment of the present invention, reference may be made to corresponding descriptions in FIG. 38, and details are not described herein again.

Figure 40:
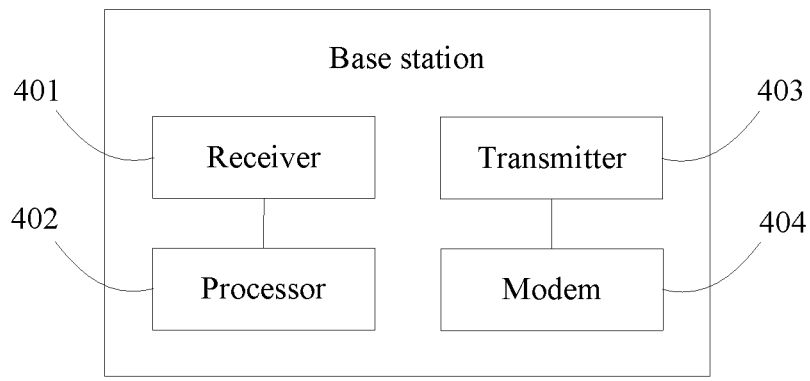
FIG. 40 is a schematic structural diagram of user equipment according to Embodiment 7 of the present invention.

Furthermore, an entity of the pilot signal transmission apparatus may be a base station. As shown in FIG. 40, the base station may include: a receiver 401, a processor 402, a transmitter 403, a modem 404, where the transmitter 403 is connected to the modem 404.

The receiver 401 is configured to receive a time division duplex TDD radio frame sent by user equipment UE.

The processor 402 is configured to acquire a pilot signal and a physical uplink shared channel PUSCH that are carried in the TDD radio frame.

The transmitter 403 is configured to transmit a control signal or a data signal.

The modem 404 is configured to convert a control signal or a data signal that needs to be transmitted by the transmitter 403 into a digital modulated signal that is applicable to channel transmission.

It should be noted that, for other descriptions corresponding to devices in the base station provided in this embodiment of the present invention, reference may be made to corresponding descriptions in FIG. 38, and details are not described herein again.

According to the pilot signal transmission method and apparatus provided in this embodiment of the present invention, first, in an uplink subframe and a special subframe that are of a TDD radio frame, a special subframe of the TDD radio frame or an uplink subframe that is after and adjacent to the special subframe is determined as a subframe for carrying a pilot signal; then, a pilot signal is carried in the subframe for carrying a pilot signal, and a PUSCH (Physical Uplink Shared Channel, physical uplink shared channel) is carried in the special subframe of the TDD radio frame. Compared with a current technology in which a PUSCH is transmitted in a common subframe in a TDD configuration, in this embodiment of the present invention, a data signal is transmitted in UpPTS of a special subframe in the TDD configuration, which can increase resources for data signal transmission. Therefore, a transmission distance of a data signal may be increased, and an uplink coverage range may further be enlarged.

Embodiment 8

Figure 41:
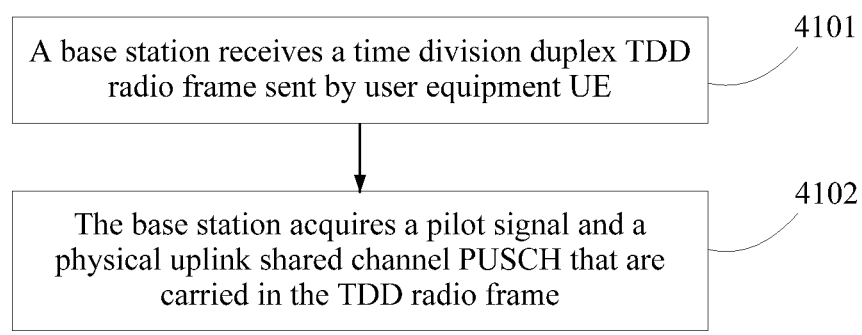
FIG. 41 is a flowchart of a pilot signal transmission method according to Embodiment 8 of the present invention.

This embodiment of the present invention provides a pilot signal transmission method. As shown in FIG. 41, the method includes the following steps:

4101. A base station receives a time division duplex TDD radio frame sent by user equipment UE.

In this embodiment of the present invention, the received TDD radio frame supports seven different TDD configurations, which are specifically shown in the following table:

| TDD configuration index | Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 5 ms | D | S | U | U | U | D | D | D | D | D |
| 4 | 5 ms | D | S | U | U | D | D | D | D | D | D |
| 5 | 5 ms | D | S | U | D | D | D | D | D | D | D |
| 6 | 5 ms | D | S | U | U | U | D | S | U | U | D |

D represents a downlink subframe, S represents a special subframe, and U represents an uplink subframe. In this embodiment of the present invention, data signals sent by the UE to the base station are sent in a special subframe and an uplink subframe.

4102. The base station acquires a pilot signal and a physical uplink shared channel PUSCH that are carried in the TDD radio frame.

Optionally, step 4102 may be that the base station acquires the pilot signal on a preset single carrier frequency division multiple access SC-FDMA symbol of a special subframe of the TDD radio frame, and acquires the PUSCH on another SC-FDMA symbol of the special subframe of the TDD radio frame.

The preset SC-FDMA symbol of the special subframe of the TDD radio frame may be a third SC-FDMA symbol in a second slot of the special subframe. In this embodiment of the present invention, the pilot signal is sent on the third SC-FDMA symbol in the second slot of the special subframe, which can reduce operation complexity of pilot signal sending.

In this embodiment of the present invention, a pilot signal and a PUSCH are acquired in UpPTS that is in a special subframe of a TDD radio frame and that is used to carry an uplink signal, which can increase resources for data signal transmission in the TDD radio frame. Therefore, a transmission distance of a data signal may be increased, and an uplink coverage range may further be enlarged.

Alternatively, step 4102 may further be that the base station acquires the pilot signal in an uplink subframe that is after and adjacent to the special subframe of the TDD radio frame, and acquires the PUSCH on the special subframe of the TDD radio frame.

In this embodiment of the present invention, a PUSCH is acquired in UpPTS that is in a special subframe of a TDD radio frame and that is used to carry an uplink signal, which can further increase resources for data signal transmission in the TDD radio frame. Therefore, a transmission distance of a data signal may be increased, and an uplink coverage range may further be enlarged.

Figure 42:
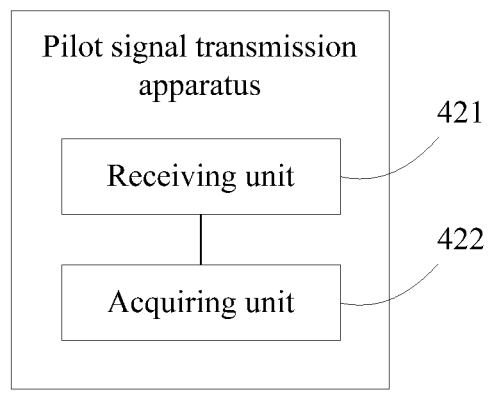
FIG. 42 is a schematic structural diagram of a pilot signal transmission apparatus according to Embodiment 8 of the present invention.

Further, in an implementation manner of the method shown in FIG. 41, this embodiment of the present invention provides a pilot signal transmission apparatus. As shown in FIG. 42, an entity of the apparatus may be a base station, and the apparatus includes a receiving unit 421 and an acquiring unit 422.

The receiving unit 421 is configured to receive a time division duplex TDD radio frame sent by user equipment UE.

The acquiring unit 422 is configured to acquire a pilot signal and a physical uplink shared channel PUSCH that are carried in the TDD radio frame received by the receiving unit 421.

The acquiring unit 422 is specifically configured to: acquire the pilot signal on a preset single carrier frequency division multiple access SC-FDMA symbol of a special subframe of the TDD radio frame received by the receiving unit 421, and acquire the PUSCH on another SC-FDMA symbol of the special subframe of the TDD radio frame.

The preset SC-FDMA symbol of the special subframe of the TDD radio frame received by the receiving unit 421 is a third SC-FDMA symbol in a second slot of the special subframe.

The acquiring unit 422 is specifically configured to: acquire the pilot signal on an uplink subframe that is after and adjacent to the special subframe of the TDD radio frame received by the receiving unit 421, and acquire the PUSCH on the special subframe of the TDD radio frame.

It should be noted that, for other descriptions corresponding to functional units in the pilot signal transmission apparatus provided in this embodiment of the present invention, reference may be made to corresponding descriptions in FIG. 41, and details are not described herein again.

Figure 43:
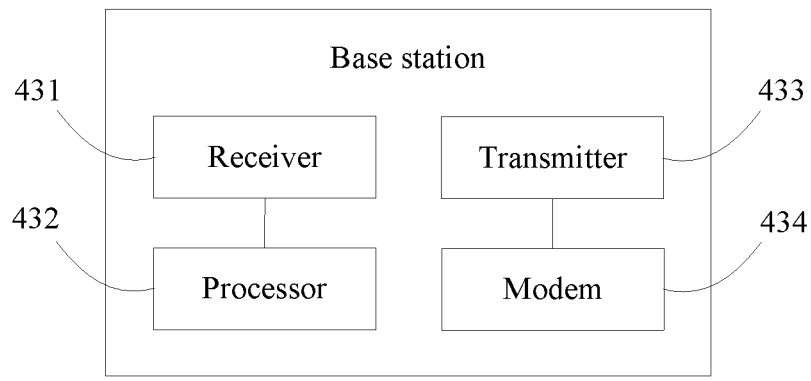
FIG. 43 is a schematic structural diagram of user equipment according to Embodiment 8 of the present invention.

Furthermore, an entity of the pilot signal transmission apparatus may be a base station. As shown in FIG. 43, the base station may include: a receiver 431, a processor 432, a transmitter 433, a modem 434, where the transmitter 433 is connected to the modem 434.

The receiver 431 is configured to receive a time division duplex TDD radio frame sent by user equipment UE.

The processor 432 is configured to acquire a pilot signal and a physical uplink shared channel PUSCH that are carried in the TDD radio frame.

The processor 432 is further configured to: acquire the pilot signal on a preset single carrier frequency division multiple access SC-FDMA symbol of a special subframe of the TDD radio frame, and acquire the PUSCH on another SC-FDMA symbol of the special subframe of the TDD radio frame.

The preset SC-FDMA symbol of the special subframe of the TDD radio frame received by the receiver 431 is a third SC-FDMA symbol in a second slot of the special subframe.

The processor 432 is further configured to: acquire the pilot signal on an uplink subframe that is after and adjacent to the special subframe of the TDD radio frame, and acquire the PUSCH on the special subframe of the TDD radio frame.

The transmitter 433 is configured to transmit a control signal or a data signal.

The modem 434 is configured to convert a control signal or a data signal that needs to be transmitted by the transmitter 433 into a digital modulated signal that is applicable to channel transmission.

It should be noted that, for other descriptions corresponding to devices in the base station provided in this embodiment of the present invention, reference may be made to corresponding descriptions in FIG. 41, and details are not described herein again.

According to the pilot signal transmission method and apparatus provided in this embodiment of the present invention, first, in an uplink subframe and a special subframe that are of a TDD radio frame, a special subframe of the TDD radio frame or an uplink subframe that is after and adjacent to the special subframe is determined as a subframe for carrying a pilot signal; then, a pilot signal is carried in the subframe for carrying a pilot signal, and a PUSCH (Physical Uplink Shared Channel, physical uplink shared channel) is carried in the special subframe of the TDD radio frame. Compared with a current technology in which a PUSCH is transmitted in a common subframe in a TDD configuration, in this embodiment of the present invention, a data signal is transmitted in UpPTS of a special subframe in the TDD configuration, which can increase resources for data signal transmission. Therefore, a transmission distance of a data signal may be increased, and an uplink coverage range may further be enlarged.

Pilot signal transmission apparatuses provided in embodiments of the present invention can implement the foregoing provided method embodiments. For detailed function implementation, reference may be made to descriptions in the method embodiments, and details are not described herein again. The pilot signal transmission methods and apparatuses provided in the embodiments of the present invention can be applicable to pilot signal transmission in a narrowband system, but are not limited thereto.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may be a magnetic disk, an optical disc, a read-only memory (Read-Only Memory, ROM), a random access memory (Random Access Memory, RAM), or the like.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A method, comprising:
determining, by user equipment (UE), a physical resource block (PRB) pair for an uplink transport channel, wherein the uplink transport channel is used for transmission of uplink data, and a quantity of subcarriers of the PRB pair is less than 12;
adding, by the UE, pilot signals to single carrier frequency division multiple access (SC-FDMA) symbols of the PRB pair, wherein a quantity of SC-FDMA symbols of the PRB pair to carry the pilot signals is greater than 2; and
sending, by the UE, the pilot signals carried in the PRB pair to a base station;
wherein the pilot signals comprise a non-zero power pilot signal and a zero power pilot signal and
before the sending the pilot signals carried in the PRB pair to the base station, the method further comprises:
acquiring configuration information of the non-zero power pilot signal by using a formula n=(n_cellID) mod m, wherein n is an index of configuration for sending the non-zero power pilot signal, n_cellID is a cell identity (ID), mod is modulo, and m is a total quantity of configurations for sending the non-zero power pilot signal.

2. The method according to claim 1, wherein the quantity of subcarriers of the PRB pair is 6 and the quantity of SC-FDMA symbols of the PRB pair to carry the pilot signals is 4.

3. The method according to claim 2, wherein the SC-FDMA symbols of the PRB pair to carry the pilot signals are a $4^{th}$, an $11^{th}$, an $18^{th}$, and a $25^{th}$ SC-FDMA symbols of the PRB pair.

4. The method according to claim 2, wherein the SC-FDMA symbols of the PRB pair to carry the pilot signals are a $7^{th}$, an $8^{th}$, a $21^{st}$, and a $22^{nd}$ SC-FDMA symbols of the PRB pair.

5. The method according to claim 1, wherein the quantity of subcarriers of the PRB pair is 3 and the quantity of SC-FDMA symbols of the PRB pair to carry the pilot signals is 8.

6. The method according to claim 1, wherein the SC-FDMA symbols of the PRB pair to carry the pilot signals are all SC-FDMA symbols of one subcarrier of the PRB pairs.

7. The method according to claim 1, wherein before sending the pilot signals carried in the PRB pair to the base station, the method further comprises:
acquiring configuration information of the non-zero power pilot signal by receiving higher layer signaling or physical layer signaling, wherein the configuration information comprises a pattern index of the pilot signal, a pilot sequence index, or a cyclic shift value of the pilot sequence.

8. The method according to claim 1, wherein the adding pilot signals to SC-FDMA symbols of the PRB pair comprises:
adding the pilot signals to the PRB pair according to a pilot sequence of the PRB pair, wherein the pilot sequence of the PRB pair is a truncated Zadoff-Chu (ZC) sequence, and a length of the truncated ZC sequence is equal to the quantity of the subcarriers of the PRB pair.

9. User equipment, comprising:
a processor, configured to: determine a physical resource block (PRB) pair for an uplink transport channel, and add pilot signals to single carrier frequency division multiple access (SC-FDMA) symbols of the PRB pair, wherein the uplink transport channel is used for transmission of uplink data, a quantity of subcarriers of the PRB pair is less than 12, and a quantity of SC-FDMA symbols of the PRB pair to carry the pilot signals is greater than 2;
a transmitter, configured to send the pilot signals carried in the PRB pair;
wherein the pilot signals added by the processor comprise a non-zero power pilot signal and a zero power pilot signal and
the processor is configured to acquire configuration information of the non-zero power pilot signal by using a formula n=(n_cellID) mod m, wherein n is an index of configuration for sending the non-zero power pilot signal, n_cellID is the cell ID, mod is modulo, and m is a total quantity of configurations for sending the non-zero power pilot signal.

10. The user equipment according to claim 9, the quantity of the subcarriers of the PRB pair is 6 and the quantity of the SC-FDMA symbols of the PRB pair to carry the pilot signals is 4.

11. The user equipment according to claim 10, wherein the SC-FDMA symbols of the PRB pair to carry the pilot signals are a $4^{th}$, an $11^{th}$, an $18^{th}$, and a $25^{th}$ SC-FDMA symbols of the PRB pair.

12. The user equipment according to claim 10, wherein the SC-FDMA symbols of the PRB pair to carry the pilot signals are a $7^{th}$, an $8^{th}$, a $21^{st}$, and a $22^{nd}$ SC-FDMA symbols of the PRB pair.

13. The user equipment according to claim 9, wherein the quantity of subcarriers of the PRB pair is 3 and the quantity of the SC-FDMA symbols of the PRB pair to carry the pilot signals is 8.

14. The user equipment according to claim 9, wherein the SC-FDMA symbols of the PRB pair to carry the pilot signals are all SC-FDMA symbols of one subcarrier of the PRB pairs.

15. The user equipment according to claim 9, wherein:
the user equipment comprises a receiver configured to receive higher layer signaling or physical layer signaling; and
the processor is configured to acquire the configuration information of the non-zero power pilot signal according to received higher layer signaling or physical layer signaling, or a cell identity ID;
wherein the configuration information comprises a pattern index of the pilot signal, a pilot sequence index, or a cyclic shift value of the pilot sequence.

16. The user equipment according to claim 9, wherein:
the processor is configured to add the pilot signals to the PRB pair according to a pilot sequence of the PRB pair, wherein the pilot sequence of the PRB pair is a truncated Zadoff-Chu (ZC) sequence, and a length of the truncated ZC sequence is equal to the quantity of subcarriers of the PRB pair.

* * * * *